United States Patent
Zhang et al.

(10) Patent No.: US 11,792,302 B2
(45) Date of Patent: Oct. 17, 2023

(54) ETHERNET HEADER COMPRESSION

(71) Applicant: Apple Inc., Cupertino, CA (US)

(72) Inventors: Yujian Zhang, Cupertino, CA (US); Youn Hyoung Heo, Cupertino, CA (US); Marta Martinez Tarradell, Cupertino, CA (US); Sudeep Palat, Cupertino, CA (US); Junaid Ansari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 17/439,311

(22) PCT Filed: Mar. 25, 2020

(86) PCT No.: PCT/US2020/024717
§ 371 (c)(1),
(2) Date: Sep. 14, 2021

(87) PCT Pub. No.: WO2020/198359
PCT Pub. Date: Oct. 1, 2020

(65) Prior Publication Data
US 2022/0159099 A1    May 19, 2022

Related U.S. Application Data

(60) Provisional application No. 62/824,905, filed on Mar. 27, 2019.

(51) Int. Cl.
*H04L 29/06* (2006.01)
*H04L 69/04* (2022.01)
(Continued)

(52) U.S. Cl.
CPC ............ *H04L 69/04* (2013.01); *H04L 1/0006* (2013.01); *H04L 1/0026* (2013.01); *H04L 69/22* (2013.01)

(58) Field of Classification Search
CPC ... H04L 1/0006; H04L 1/0026; H04L 1/0061; H04L 29/06; H04L 67/1097; H04L 67/14;
(Continued)

(56) References Cited

U.S. PATENT DOCUMENTS 7,035,287 B2 *   4/2006   Tourunen ................ H04L 69/22
                                                                 370/477
7,594,036 B2 *   9/2009   Weller .................... H04L 69/04
                                                                 709/236
(Continued)

FOREIGN PATENT DOCUMENTS

KR          10-1724231        4/2017
WO       WO 2015/158389    * 10/2015

OTHER PUBLICATIONS

[No Author Listed], "3rd Generation Partnership Project; Technical Specification Group Radio Access Network; NR; Packet Data Convergence Protocol (PDCP) specification (Release 15)," 3GPP TS 38.323 V15.4.0, Dec. 2018, 26 pages.

(Continued)

*Primary Examiner* — Frank Duong
(74) *Attorney, Agent, or Firm* — Fish & Richardson P.C.

(57) ABSTRACT

Disclosed are methods, systems, apparatus, and computer programs for compressing an Ethernet packet. In one aspect, a method involves mapping a portion of the Ethernet packet to a connection identity to compress the Ethernet packet. Additionally, the method involves encoding, in a user plane protocol stack layer, the connection identity in a data structure for transmission.

18 Claims, 20 Drawing Sheets

(51) Int. Cl.
*H04L 1/00* (2006.01)
*H04L 69/22* (2022.01)

(58) Field of Classification Search
CPC ....... H04L 67/564; H04L 69/04; H04L 69/16; H04L 69/22; H04L 69/24; H04W 28/06; H04W 80/02
See application file for complete search history.

(56) References Cited

U.S. PATENT DOCUMENTS

| | | | | |
|---|---|---|---|---|
| 9,125,088 | B2* | 9/2015 | Pelletier | H04W 28/06 |
| 10,194,348 | B2* | 1/2019 | Agrawal | H04L 69/04 |
| 10,299,163 | B2* | 5/2019 | Yang | H04W 28/0215 |
| 11,006,316 | B2* | 5/2021 | Qiao | H04L 69/04 |
| 11,310,352 | B2* | 4/2022 | Isomäki | H04L 69/16 |
| 2005/0271066 | A1 | 12/2005 | Valadarsky | |
| 2010/0202458 | A1 | 8/2010 | Sato | |
| 2012/0213180 | A1* | 8/2012 | Meylan | H04W 28/22 370/329 |
| 2013/0128808 | A1 | 5/2013 | Wentink et al. | |
| 2014/0119377 | A1 | 5/2014 | Crosta et al. | |
| 2014/0369365 | A1 | 12/2014 | Denio et al. | |
| 2019/0116521 | A1* | 4/2019 | Qiao | H04L 69/04 |
| 2019/0124181 | A1* | 4/2019 | Park | H04W 36/0033 |
| 2020/0267241 | A1* | 8/2020 | Johansson | H04L 69/22 |
| 2020/0314690 | A1* | 10/2020 | Kim | H04W 28/06 |
| 2022/0038560 | A1* | 2/2022 | Kim | H04L 69/04 |

OTHER PUBLICATIONS

[No Author Listed], "3rd Generation Partnership Project; Technical Specification Group Radio Access Network; NR; Radio Resource Control (RRC) protocol specification (Release 15)," 3GPP TS 38.331 V15.4.0 , Dec. 2018, 474 pages.
Ericsson, "Ethernet Header Compression," 3GPP TSG-RAN WG2 #103bis Tdoc R2-1814811, Chengdu, China, Oct. 8-12, 2018, 5 pages.
International Preliminary Report on Patentability in International Appln. No. PCT/US2020/024717, dated Oct. 7, 2021, 10 pages.
International Search Report and Written Opinion in International Appln. No. PCT/US2020/024717, dated Jul. 17, 2020, 17 pages.
Vivo, "Consideration on Ethernet header compression for supporting IIOT," 3GPP TSG-RAN WG2 Meeting #103bis, R2-1814273, Chengdu, China, Oct. 8-12, 2018, 2 pages.
Extended European Search Report in European U.S. Appl. No. 19/880,503, dated Jul. 4, 2022, 10 pages.
International Preliminary Report on Patentability in International Appln. No. PCT/US2019/059177, dated Apr. 27, 2021, 7 pages.
International Search Report and Written Opinion in International Appln. No. PCT/US2019/059177, dated Feb. 20, 2020, 10 pages.

* cited by examiner

ETHERNET HEADER COMPRESSION

CLAIM OF PRIORITY

The present application is a U.S. National Phase application under 35 U.S.C. § 371 of International Patent Application No. PCT/US2020/024717, filed on Mar. 25, 2020, which claims priority to U.S. Provisional Patent Application No. 62/824,905 filed Mar. 27, 2019, entitled "Methods for Ethernet Header Compression," the disclosure of each of which are incorporated herein by reference in their entirety.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for compressing Ethernet headers.

In accordance with one aspect of the present disclosure, a method for compressing an Ethernet header is disclosed. In one aspect, a method involves mapping a portion of an Ethernet packet to a connection identity to compress the Ethernet packet. Additionally, the method involves encoding, in a user plane protocol stack layer, the connection identity in a data structure for transmission.

Other versions include corresponding systems, apparatus, and computer programs to perform the actions of methods defined by instructions encoded on computer readable storage devices. These and other versions may optionally include one or more of the following features.

In some implementations, the user plane protocol stack layer is a packet data convergence protocol (PDCP) layer or a service data adaptation protocol (SDAP) layer.

In some implementations, the portion of the Ethernet packet is one or more of: an Ethernet packet header or an Ethernet packet trailer.

In some implementations, the connection identity represents one or more fields of the portion of the Ethernet packet.

In some implementations, the portion of the Ethernet packet is an Ethernet header that includes at least one of: a destination address field, a source address field, a type field, a length field, or an 802.1Q flag field.

In some implementations, the Ethernet packet further includes an IP header, and the process further includes: using Robust Header Compression (ROHC) to compress the IP header, where the compression of the Ethernet header and IP header are performed separately.

In some implementations, the data structure further includes a cyclic redundancy check (CRC) of the Ethernet header before compression.

In some implementations, the data structure further includes a length/type field that is indicative of a payload type, and the method further includes: mapping payload types to payload identities, where the payload identities are one bit values; and including a payload identity that corresponds to a payload type of the Ethernet packet in the length/type field.

In some implementations, the data structure is a packet data convergence protocol (PDCP) data protocol data unit (PDU).

In some implementations, the data structure includes a Type field indicative of a format of the data structure, where the format of the data structure is indicative of the information included in the data structure.

In accordance with another aspect of the present disclosure, a method for transmitting a compressed Ethernet packet is disclosed. The method includes sending, by a transmitter, one or more uncompressed Ethernet packets to a receiver. The one or more Ethernet packets include data indicative of a connection identity that maps in part to a source/destination address pair, and the one or more uncompressed Ethernet packets include an Ethernet header source field and an Ethernet header destination field. The method also involves generating, by the transmitter, a compressed Ethernet packet by including the connection identity in the compressed Ethernet packet. The compressed Ethernet packet does not include the Ethernet header source field and the Ethernet header destination field. Further, the method involves sending, by the transmitter, the compressed Ethernet packet to the receiver.

Other versions include corresponding systems, apparatus, and computer programs to perform the actions of methods defined by instructions encoded on computer readable storage devices. These and other versions may optionally include one or more of the following features.

In some implementations, the method further includes receiving, by the transmitter, feedback from the receiver prior to sending the compressed Ethernet packet to the receiver. The feedback indicates whether the one or more uncompressed Ethernet packets have been successfully received by the receiver.

In some implementations, the feedback includes a plurality of feedback transmissions, and a number of the plurality of feedback transmissions is based on one or more of: the receiver's mobility state, measured values of Reference Signal Received Power/Reference Signal Received Quality/Signal-To-Noise and Interference Ratio (RSRP/RSRQ/SINR), or desired degree of transmission reliability.

In some implementations, sending, by the transmitter, one or more uncompressed Ethernet packets to the receiver includes determining whether to send the one or more uncompressed Ethernet packets to the receiver prior to sending the compressed Ethernet packet to the receiver. The determination is based on at least one of: (i) a link quality between the transmitter and the receiver or (ii) a desired degree of transmission reliability.

In some implementations, a number of the one or more uncompressed Ethernet packets is based on one or more of: the receiver's mobility state, measured values of Reference Signal Received Power/Reference Signal Received Quality/Signal-To-Noise and Interference Ratio (RSRP/RSRQ/SINR), or desired degree of transmission reliability.

In some implementations, a number of the one or more uncompressed Ethernet packets is configured by a network that serves the transmitter.

In some implementations, a number of the one or more uncompressed Ethernet packets is predetermined.

DESCRIPTION OF DRAWINGS

Like reference numbers and designations in the various drawings indicate like elements.

DETAILED DESCRIPTION

3GPP 5G New Radio (NR), a fifth generation of mobile technology, is positioned to enable a fully mobile and connected society. With the aim of supporting new use cases like factory automation, transport industry, and electrical power distribution, new mobile technologies may support Time Sensitive Networking (TSN). One of the most widely used protocols in TSN is the Ethernet protocol. However, one issue with Ethernet is that Ethernet headers have substantial overhead, particularly when a payload size of an Ethernet packet is small.

The present disclosure describes systems and methods for Ethernet header compression. The disclosed systems and methods reduce Ethernet header overhead, thereby increasing resource efficiency and reliability, as well as reducing latency. Additionally, efficiently using radio and network resources helps increase system capacity and improve spectral usage footprint. In an embodiment, a compression method may be applied to one or more fields in an Ethernet packet, such as a header (e.g., source/destination address, length/type, etc.) and a trailer (e.g., padding, frame check sequence, etc.). For the sake of simplicity, the term "Ethernet header" is used in this disclosure to denote both a header and a trailer. Additionally, in the present disclosure, the description of Ethernet header compression is generally described in the context of 3GPP 5G NR standards. However, the disclosed systems and methods can also be applied to other communication systems and standards, such as 3GPP LTE standards.

Figure 1:
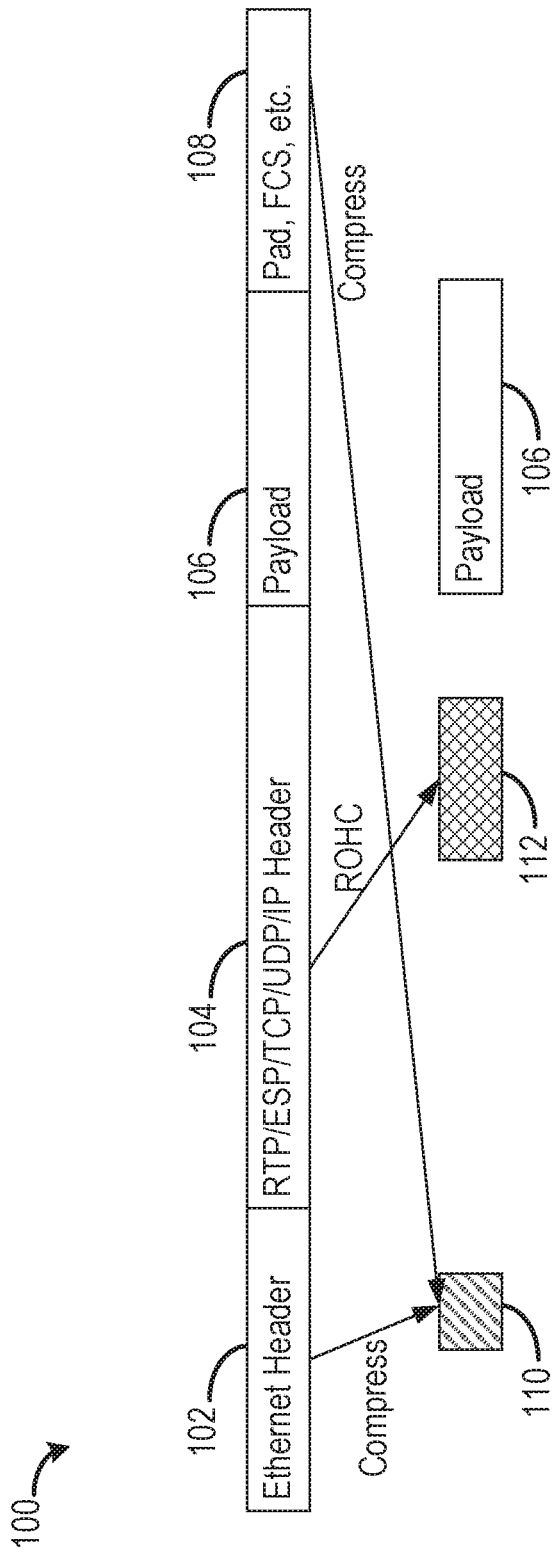
FIG. 1 illustrates an example Ethernet packet, according to some implementations of the present disclosure.

FIG. 1 illustrates an example Ethernet packet 100, according to some implementations. As shown in FIG. 1, the Ethernet packet 100 may include an Ethernet header 102, a RTP/ESP/TCP/UDP/IP header 104, a payload 106, and an Ethernet trailer 108. Within examples, the payload 106 may carry data using one or more of the following protocols: Internet Protocol (IP), User Datagram Protocol (UDP), Transmission Control Protocol (TCP), Real-time Transport Protocol (RTP), and/or Encapsulating Security Payload (ESP). In this disclosure, RTP/ESP/TCP/UDP/IP may be used to denote a combination of the protocols that is used in an Ethernet packet (e.g., IP, TCP/IP, UDP/IP, ESP/IP, RTP/UDP/IP). Accordingly, the RTP/ESP/TCP/UDP/IP header 104 may be a header of protocols used in the payload 106.

In an embodiment, compressing the Ethernet packet 100 may involve compressing the Ethernet header 102 and the RTP/ESP/TCP/UDP/IP header 104 separately. In an example, RObust Header Compression (ROHC) may be used to compress the RTP/ESP/TCP/UDP/IP header 104. The ROHC operation may determine the starting position of the RTP/ESP/TCP/UDP/IP header 104 in order to compress the header. This determination is similar to the NR protocol of handling ROHC in the presence of the Service Data Adaptation Protocol (SDAP) layer, where ROHC determines a length of an SDAP header (e.g., zero or one bytes). The separate compression of the Ethernet header 102 and the RTP/ESP/TCP/UDP/IP header 104 is depicted in FIG. 1. As shown in FIG. 1, the Ethernet header 102 and the Ethernet trailer 108 may be compressed together, perhaps using the disclosed compression methods, into compressed data 110. The RTP/ESP/TCP/UDP/IP header 104 may be compressed separately using ROHC into compressed data 112.

In an example, compression of the Ethernet header (e.g., Ethernet header 102 and trailer 108) may be incorporated in the Packet Data Convergence Protocol (PDCP) layer or the Service Data Adaptation Protocol (SDAP) layer. In NR systems, the layer 2 user plane protocol stack includes the layers SDAP, PDCP, radio link control (RLC), and Medium Access Control (MAC). In another example, the disclosed Ethernet header compression may be incorporated into a new layer.

Figure 2:
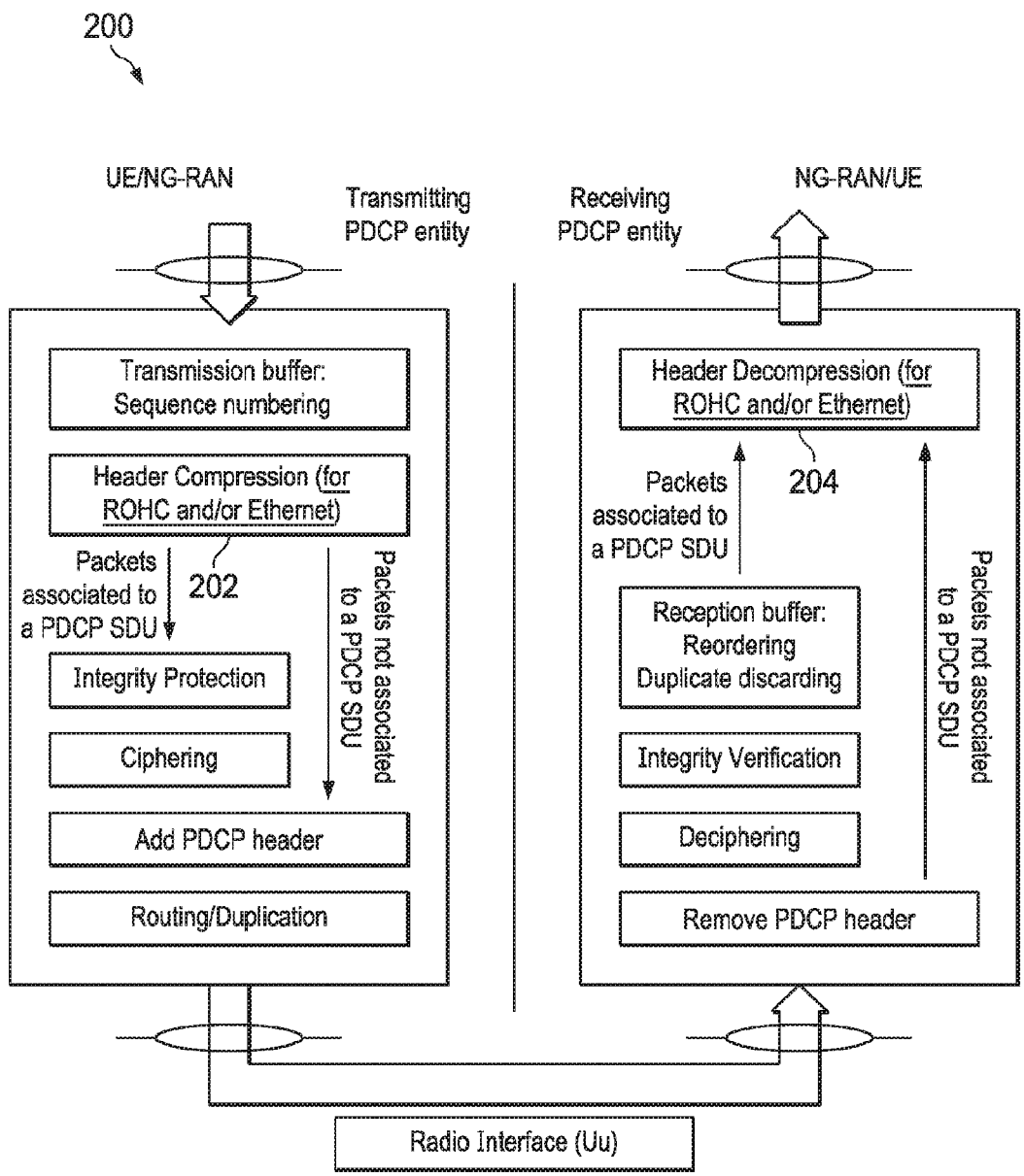
FIG. 2 illustrates a block diagram of a functional view of the Packet Data Convergence Protocol layer, according to some implementations of the present disclosure.

FIG. 2 illustrates a block diagram of a functional view of the PDCP layer, according to some implementations. As shown in FIG. 2, Header Compression 202 at the transmitter side may be modified to incorporate ROHC and Ethernet Header compression. Header Decompression 204 at the receiver side may be modified to incorporate ROHC and Ethernet Header decompression.

In an embodiment, Header Compression 202 may determine which information of an Ethernet frame to compress. Generally, an Ethernet frame includes a preamble, a Start Frame Delimiter (SFD) field, a destination address and a source address, length/type field and a 802.1Q tag, a pad (ding) field, and a Frame Check Sequence (FCS) field. The preamble may allow the physical signaling (PLS) circuitry to reach steady-state synchronization with a received packet's timing. Given that it is fixed sequence, the Header Compression 202 may determine not to transmit the preamble after compression (that is, the preamble is not included in a compressed packet). The SFD is a fixed bit sequence (e.g., 10101011), and therefore, the Header Compression 202 may determine not to transmit the field after compression. The FCS field is used for error detection. The Header Compression 202 may determine not to transmit the FCS field after compression since lower layers provide cyclic redundancy check (CRC) detection. The pad(ding) field may be used to satisfy a minimum MAC frame size constraint. The Header Compression 202 determines not to transmit this field if a length of an Ethernet payload can be determined either from the Ethernet header and/or by packet inspection of the payload. As for the destination address, source address, length/type field, and 802.1Q tag, Header Compression 202 may determine to compress one or more of these fields.

In an embodiment, to compress an Ethernet header, Header Compression 202 may use a connection identity (ID) to represent a portion of the Ethernet header. In an example, Header Compression 202 may use a connection identity to represent a source and destination address pair. In this example, the variables (x, y) may be used to represent the source address x and the destination address y. Header Compression 202 may store these mappings in a connection identity table.

In some examples, the connection identity may be related to a link direction. In wireless communications, downlink is the direction from a node of the network to a terminal (e.g., a user equipment), and uplink (UL) is the direction from the terminal to the network node. As such, the relationship between connection identity and link direction may be represented in one of two approaches. In a first approach (called joint representation), the connection identity is applicable to both the downlink and the uplink. In this approach, if a connection identity n corresponds to a source/destination address pair (x, y) in the downlink, then the same connection identity n corresponds to a source/destination address pair (y, x) in the uplink. In a second approach (called independent representation), the connection identities for the downlink and the uplink are independent. In this approach, there is no relationship between source/destination address pairs associated with the same connection identity for the downlink and the uplink.

In some examples, connection identities may also be unique to Data Radio Bearers (DRBs). This may increase usage of connection identities since the same connection identity can be reused across different DRBs to map to different information.

In some examples, in addition to representing source/destination address pairs, a connection identity may also represent a subset of Ethernet header fields. As an example, a connection identity may represent a unique combination of the Ethernet header fields: (i) destination address, (ii) source address, (iii) type/length, and (iv) 802.1Q tag. As another example, a connection identity may represent a unique combination of the Ethernet header fields: (i) destination address, (ii) source address, and (iii) type/length. Furthermore, in examples where the connection identities in the downlink and uplink are independent, the same connection identity may refer to a different unique combination of Ethernet header fields for the downlink and uplink.

In some examples, a Virtual Local Area Network (VLAN) identifier (VID) in an 802.1Q tag may also be compressed. For instance, VID may be represented, together with other Ethernet header field, by a connection identity. Alternatively, a delta encoding can be introduced for VID. In this example, the delta encoding encodes a difference between a current VID and VID signaling in a previous packet.

In an embodiment, a connection identity may be mapped to the Ethernet header fields that are present when an uncompressed Ethernet header is transmitted (as opposed to representing a fixed set of Ethernet header fields). For example, when a connection identity m is first used, and the Ethernet header fields destination address, source address, and type/length are present (while 802.1Q flag is not present), then the connection identity m may represent the values of destination address, source address, and type/length in a corresponding compressed header. Similarly, when a connection identity n is first used and the Ethernet header fields destination address, source address, type/length, and 802.1Q flag are present, then the connection identity n may represent the values of destination address, source address, type/length, and 802.1Q flag in a corresponding compressed header.

Figure 3:
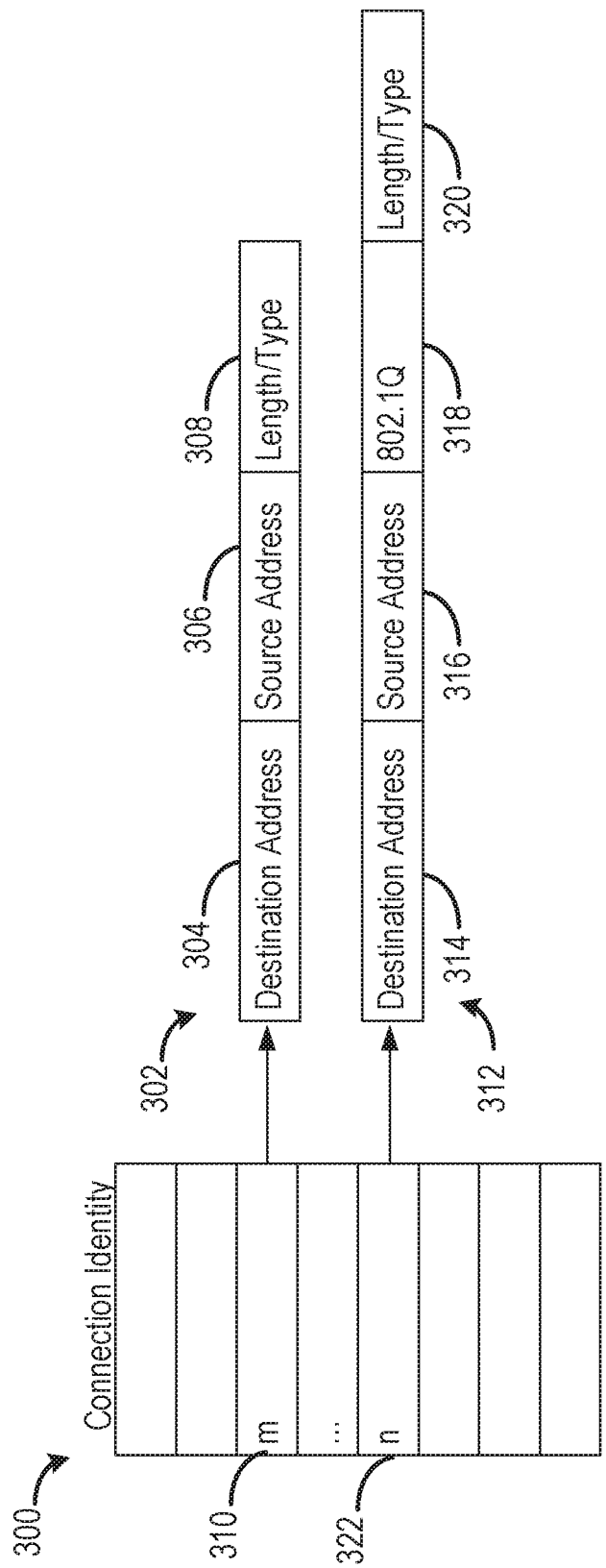
FIG. 3 illustrates a connection identity to Ethernet header field mapping, according to some implementations of the present disclosure.

FIG. 3 illustrates a connection identity to Ethernet header field mapping, according to some implementations. In the example of FIG. 3, the connection identities are stored in a connection identity table 300. For instance, a connection identity m is stored in field 310 and connection identity n is stored in field 322. As shown in FIG. 3, the connection identity m maps to the header fields 302 that include destination address 304, source address 306, and type/length 308. Thus, the connection identity m represents values of the header fields 302 when in a corresponding compressed header. As shown in FIG. 3, the connection identity n maps to the header fields 312 that include destination address 314, source address 316, 802.1Q flag 318, and type/length 320. Thus, the connection identity n represents values of the header fields 312 in a corresponding compressed header. As illustrated by this example, the connection identity table 300 can support multiple Ethernet frame formats dynamically without reconfiguration.

In an embodiment, signaling may be used to map between the connection identity and the header fields. In an example, RRC signaling may be used to signal the mapping. In this example, RRC signaling may be used to add, modify, and/or remove the mapping between a connection identity and Ethernet header fields. The signaling can be added in information elements (IEs) such as PDCP-Config, DRB-ToAddMod, or perhaps a new IE. In another example, a PDCP control PDU may be used for signaling the mapping. In this example, a new PDCP control PDU may be introduced to add, modify, and/or remove the mapping between a connection identity and Ethernet header fields. A "PDU type" field in the PDCP control PDU may be 010 (or another higher value) to indicate that the control PDU is used for signaling the mapping between a connection identity and Ethernet header fields. In examples where the Ethernet header compression is performed in the SDAP layer, the mapping can be signaled using an SDAP control PDU. And in examples where the Ethernet header compression is performed in a new layer, the mapping relationship can be signaled in the control PDU of the new layer. In yet another example, a PDCP data PDU may be used for signaling the mapping. This example may be considered "in-band" signaling and is discussed in further detail below with respect to FIGS. 4-7. In examples where the Ethernet header compression is performed in the SDAP layer, the mapping can be signaled in an SDAP data PDU. And in examples where the Ethernet header compression is performed in a new layer, the mapping relationship can be signaled in the data PDU of the new layer.

FIGS. 4, 5, 6, and 7 illustrate example data structures, according to some implementations. These data structures may be used to transmit Ethernet headers and may signal a connection identity in the transmitted headers. In an example, the data structures A length of the connection identity may be fixed, configured by RRC signaling, or signaled in the data PDU itself. In an example, the connection identity may have a length of 6 bits, but other bit lengths, such as 2, 4, 8, 12, 16, 32, and 64, are also contemplated herein. The Ethernet header may also include a "Type" field. This field may correspond to different types of packet headers, such as the packet headers illustrated in FIGS. 4-7. In an example, the length of the "Type" field may be determined based on how many types of headers are supported. Accordingly, this field may have any appropriate length, such as 2 bits, 3 bits, and 4 bits.

Figure 4:
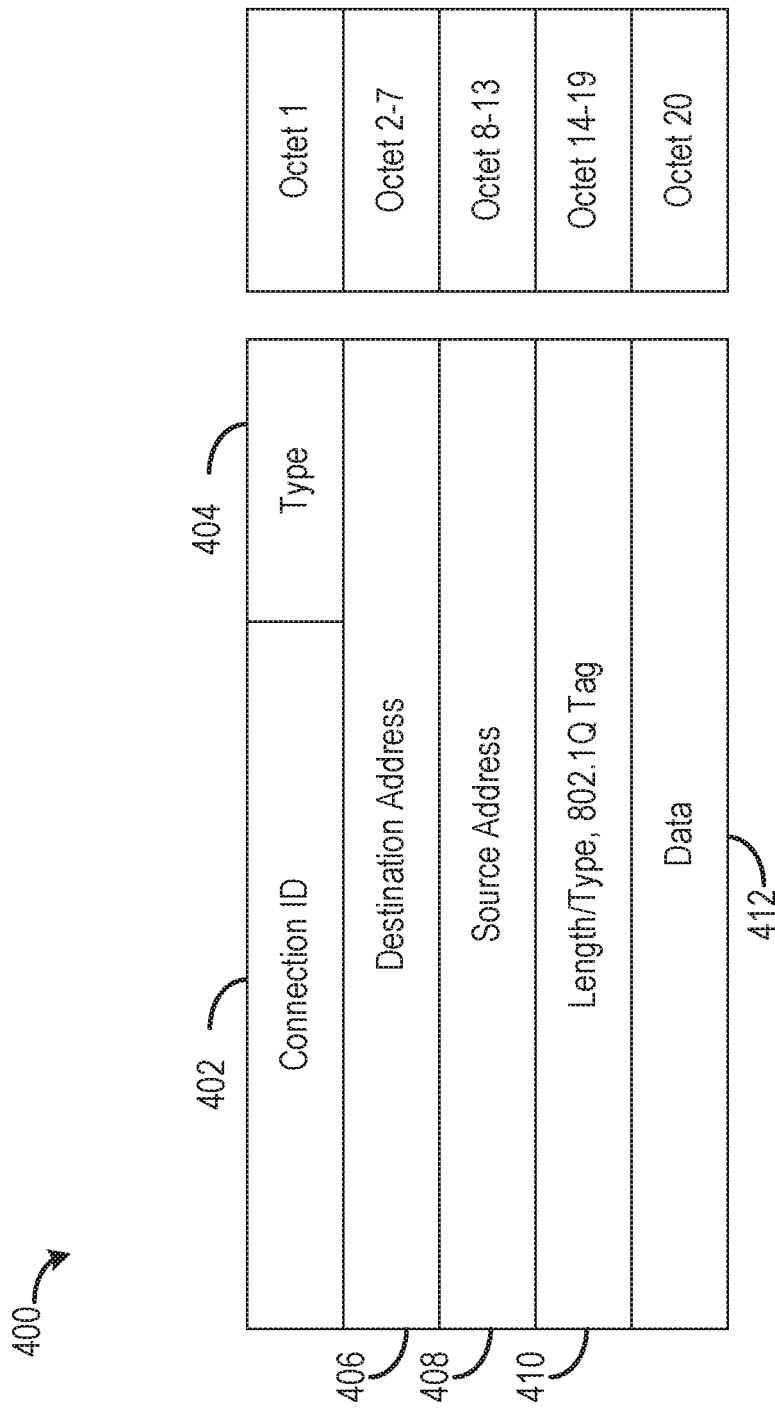
FIGS. 4, 5, 6, and 7 each illustrate an example data structure for carrying an Ethernet header, according to some implementations of the present disclosure.

FIG. 4 illustrates an example header 400. In this example, header 400 is an uncompressed header. As shown in FIG. 4, header 400 includes a Connection ID field 402, a Type field 404, Destination Address field 406, a Source Address field 408, a Length/type and 802.1Q tag field 410, and a data field 412. In this example, a Destination Address, a Source Address, a Length/type, and a 802.1Q tag may be signaled as is (without any compression). Further, one 802.1Q tag is inserted in header 400. Note that other Ethernet header fields like the preamble, SFD, and FCS are not transmitted in header 400. In an example, uncompressed header 400 may be transmitted when a connection is first established, such as when a new source/destination address pair is used for the first time in a link. This header may be used, for example, by a transmitter to indicate the mapping between a connection identity and Ethernet header fields in the PDCP data PDU. For instance, header 400 may indicate that a connection identity included in the Connection Identity field 402 may map to one or more of the fields 406-410. Furthermore, the transmitter may include the uncompressed header 400 in one or more packets to increase transmission reliability. The decision for sending uncompressed headers in one or more packets is configurable and can be made at runtime by the transmitter, for example, based on the link quality and/or desired reliability target.

Figure 5:
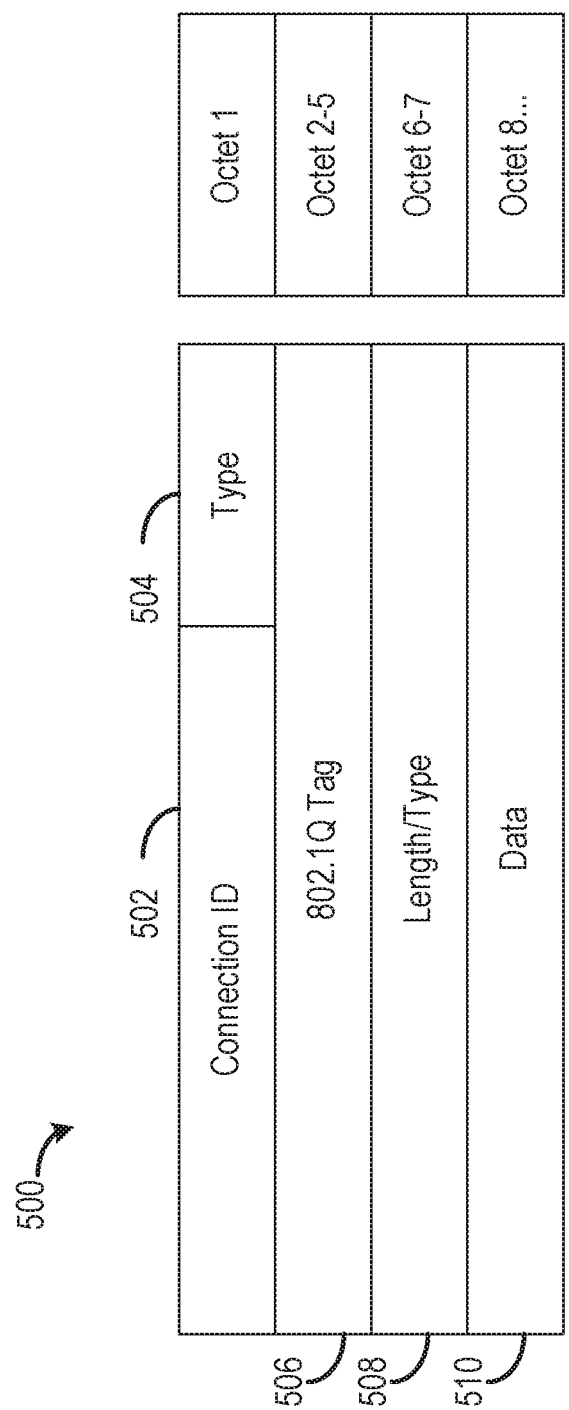

FIG. 5 illustrates an example header 500. As shown in FIG. 5, header 500 includes a Connection ID field 502, a Type field 504, a Length/type field 508, a 802.1Q tag field 506, and a data field 510. In this example, the Ethernet fields Length/type and 802.1Q tag(s) are signaled without compression. The destination and source addresses, however, are compressed. Thus, unlike header 400, header 500 does not includes the fields Destination Address and Source Address. Further, in header 500, one 802.1Q tag is inserted in the field 506. In an example, a transmitter may use header 500 when the transmitter has already sent the Source and Destination addresses mapping to a connection identity, and therefore, these fields may not be included in the header 500. The connection identity included in the Connection ID 502 field may represent the source and destination addresses. Note that this header format can accommodate any change in Ethernet header formats regarding length/type and 802.1Q tags.

Figure 6:
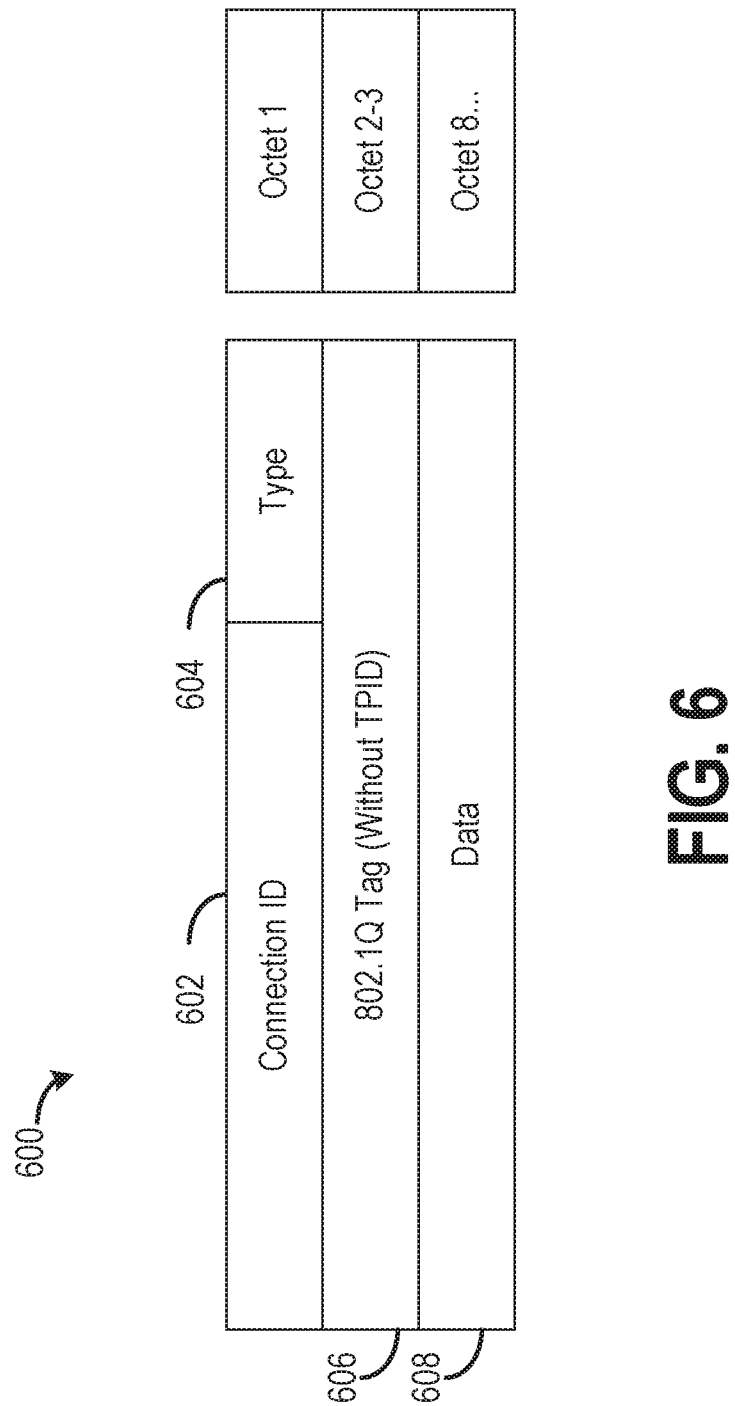

FIG. 6 illustrates an example header 600. As shown in FIG. 6, header 600 includes a Connection ID field 602, a Type field 604, a 802.1Q tag field 606, and a data field 608. In this example, the 802.1Q tag may be transmitted without a tag protocol identifier (TPID) since the TPID is a fixed value for 802.1Q (e.g., 0x8100). Further, it is assumed that there is one 802.1Q tag inserted in the field 606. The fields that are not included in header 600 may be represented by a connection identity included in the Connection ID field 602. For example, the fields Destination Address, Source Address, and Length/type field may be represented by the connection identity. The Length/type field may be removed from the header if it is indicative of the payload size since it is possible to determine the payload size from lower layers. However, if the length/type field is indicative of the payload type (e.g., length/type field is EtherType), a mapping table from long EtherType (e.g., 2 bytes) to a list of short identities (IDs) may be designed. In an example, a 4-bit Short Payload Type field may be used to represent the EtherType. In this example, "0" may be indicative of an IPv4 payload (EtherType 0x0800) and "1" may be indicative of an IPv6 payload (EtherType 0x86DD). Additionally, a special value (e.g., 15) may be indicative of an EtherType not in the mapping table. In this scenario, the actual EtherType can follow the Short Payload Type field. Note that the Short Payload Type field is not illustrated in FIG. 6.

Figure 7:
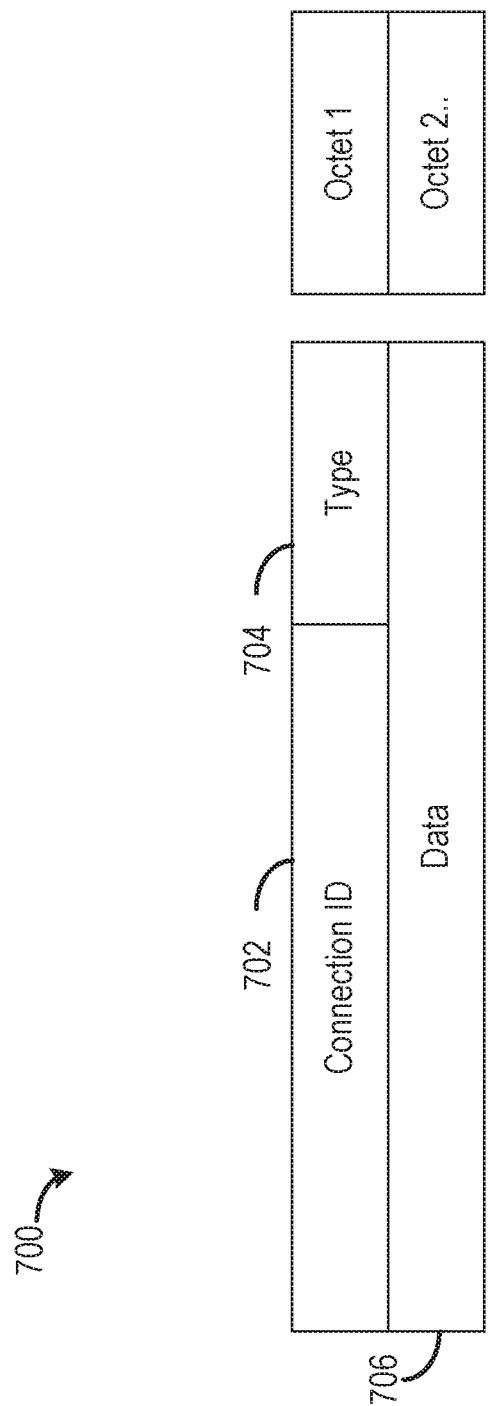

FIG. 7 illustrates an example header 700. As shown in FIG. 7, header 700 includes a Connection ID field 702, a Type field 704, and a data field 708. In this example header, a connection identity may represent a unique combination of the Ethernet header fields (i) destination address, (ii) source address, (iii) type/length, and/or (iv) 802.1Q tag. In an embodiment, a transmitter may transmit the compressed header 700 after the transmission of an uncompressed header (e.g., header 400) that includes the connection identity corresponding to the compressed header 700. As shown in FIG. 7, the fields present within the PDCP PDU payload are "Connection ID" and "Type." In this example, the Ethernet header fields (e.g., Destination/Source Address, Length/type, and 802.1Q tag) are represented by "Connection ID," and therefore, are not included in the payload. Note that in the examples of FIGS. 4-7, the "Type" field is a two-bit field. In other examples, the "Type" field may be a 1-bit field to differentiate between compressed and uncompressed Ethernet header fields. Furthermore, a length of the "Connection ID" field may be configurable to different lengths, such as 7 bits, 14 bits, 15 bits, etc.

It should be noted that above are only a few non-limiting examples to illustrate the header formats for Ethernet header compression. It is possible to have different combinations/variations.

In some embodiments, an Ethernet header may also include a cyclic redundancy check (CRC) of the original Ethernet header before compression. This allows a receiver to verify that decompression operation was performed correctly. In some embodiments, feedback may be provided by a receiver to a transmitter to indicate a status of the receiver. For example, the status may indicate whether an uncompressed header has been received successfully. The feedback may be transmitted in a PDCP data PDU, perhaps using one of the header formats disclosed herein. In particular, a dedicated "Type" field for the feedback may be used. Additionally and/or alternatively, the feedback may be sent with a PDCP control PDU, perhaps using a new value for "PDU Type" to indicate the Ethernet header compression feedback.

In an embodiment, a network may configure a number of transmissions for feedback for a specific connection identity. Additionally and/or alternatively, the network may provide criteria to a UE so that the UE may select the number of transmissions for feedback. The criteria may include the UE's mobility state, measured values of Reference Signal Received Power/Reference Signal Received Quality/Signal-To-Noise and Interference Ratio (RSRP/RSRQ/SINR), source/destination address pairs, UL/DL direction, and/or desired degree of reliability. The network may configure the UE using RRC signaling or a PDCP control PDU. In an example, when a receiver UE first receives an uncompressed header for a certain connection identity, the receiver UE may transmit feedback for that connection identity according to the number of transmissions configured by the network. After transmitting the uncompressed Ethernet header for one specific connection identity, a transmitter UE can transmit a compressed header if a feedback for the connection identity is received.

In another embodiment, a receiver UE may not be configured to provide feedback. In this embodiment, a transmitter UE may transmit a compressed header only after a number of transmissions of a corresponding uncompressed header have been completed. A number of transmissions of the uncompressed header can be either fixed/predetermined (e.g. fixed to 2 or 3 transmissions) or configured by the network. The network can configure the number of transmissions of the uncompressed header using RRC signaling or a PDCP control PDU. The number of transmissions of the uncompressed header can be configured per UE, per cell group, per DRB, per cell, per link direction (UL/DL), or any combination thereof. The number of transmissions of the uncompressed header can be defined or configured depending on specific conditions, such as a UE's mobility state, measured RSRP/RSRQ/SINR values, source/destination address pairs, UL/DL direction, and/or desired degree of reliability.

Figure 8:
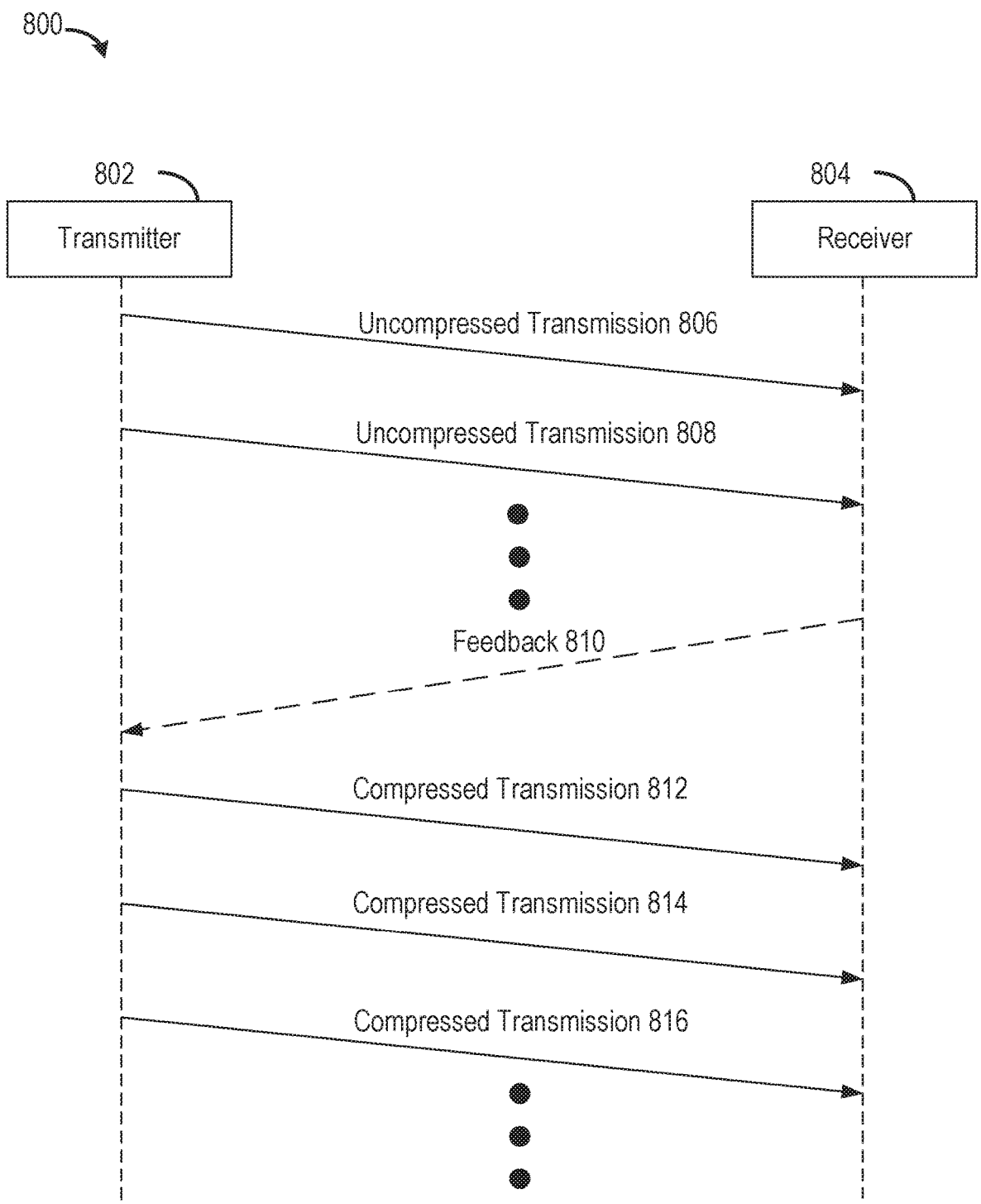
FIG. 8 illustrates an example Ethernet header compression messaging diagram, according to some implementations of the present disclosure.

FIG. 8 illustrates an example Ethernet header compression messaging diagram 800, according to some implementations. As show in FIG. 8, a transmitter 802 sends to a receiver 804 one or more packets with an uncompressed Ethernet header (e.g., uncompressed transmissions 806, 808) followed by packets with a compressed Ethernet header (compressed transmissions 812, 814, and 816). In some examples, the receiver 804 may be configured to send feedback 810 in response to a successful reception of the uncompressed transmission(s) in order to trigger compressed transmissions 812, 814, 816.

If a UE undergoes PDCP re-establishment (e.g., handover), the network can inform the UE whether to reset the Ethernet header compression operation. For example, the network can inform the UE whether to maintain the connection identities. This can be done using RRC signaling, PDCP control PDU, etc. In an example, the RRC signaling to configure Ethernet header compression may include:

```
PDCP-Config : : =         SEQUENCE {
    ... ,
    [ [
    cipheringDisabled           ENUMERATED {true}
    OPTIONAL      -- Cond ConnectedTo5GC
    ] ],
    [ [
    ethernetHeaderCompression CHOICE {
                    notUsed       NULL,
                    compression   SEQUENCE {
                        maxCID    INTEGER (1..16383)
    DEFAULT 15,
                        drb-ContinueEthernetCompression ENUMERATED
                        { true }
    OPTIONAL      -- Need N
                    },
                    ...
            },
        ] ]
}
```

As shown by the RRC signaling, the IE PDCP-config may be modified to include Ethernet header compression signaling. Similar changes could be applicable for other IEs. In this example, when compression is signaled instead of notUsed, Ethernet header compression is enabled for a DRB. The field maxCID may be used to configure a maximum number of connection identities. If field drb-ContinueEthernetCompression is signaled, then the UE may continue an Ethernet header compression operation without resetting the mapping relationships between the connection identities to the source/destination address (and other fields like VLAN identifier). Otherwise, the Ethernet header compression operation may be reset. In this example, the configuration of Ethernet header compression is per DRB. It is also possible that Ethernet header compression is configured independently for DL and UL in a DRB.

Figure 9A:
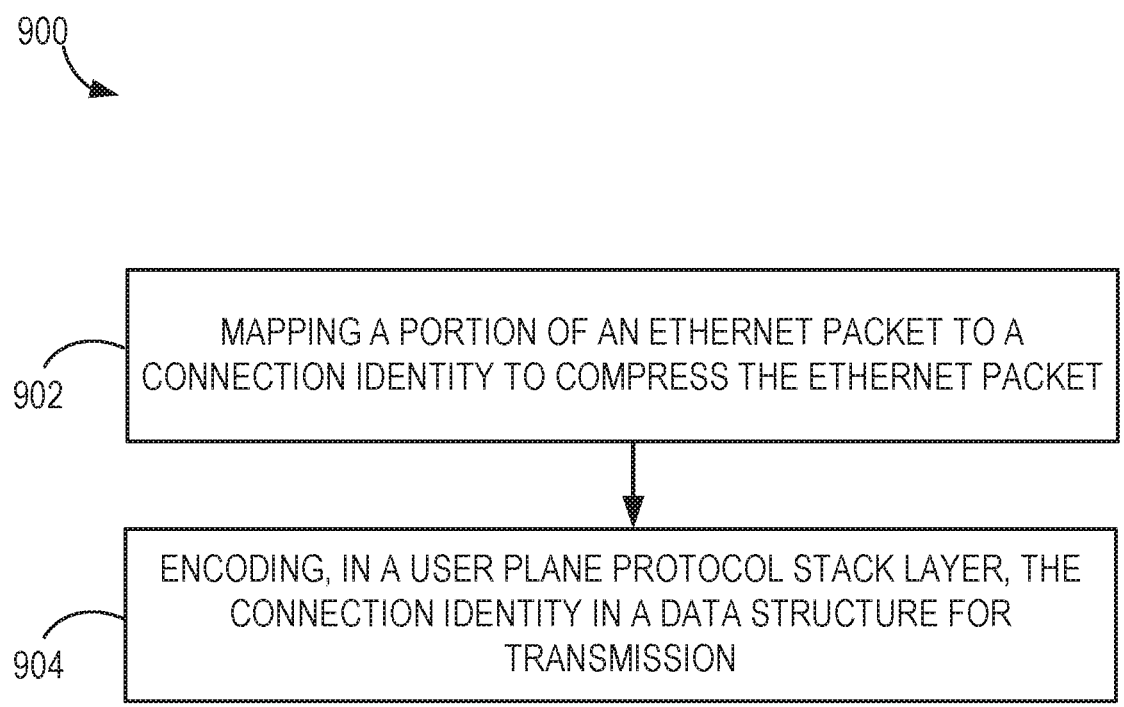
FIGS. 9A and 9B each illustrate an example method, according to some implementations of the present disclosure.
Figure 9B:
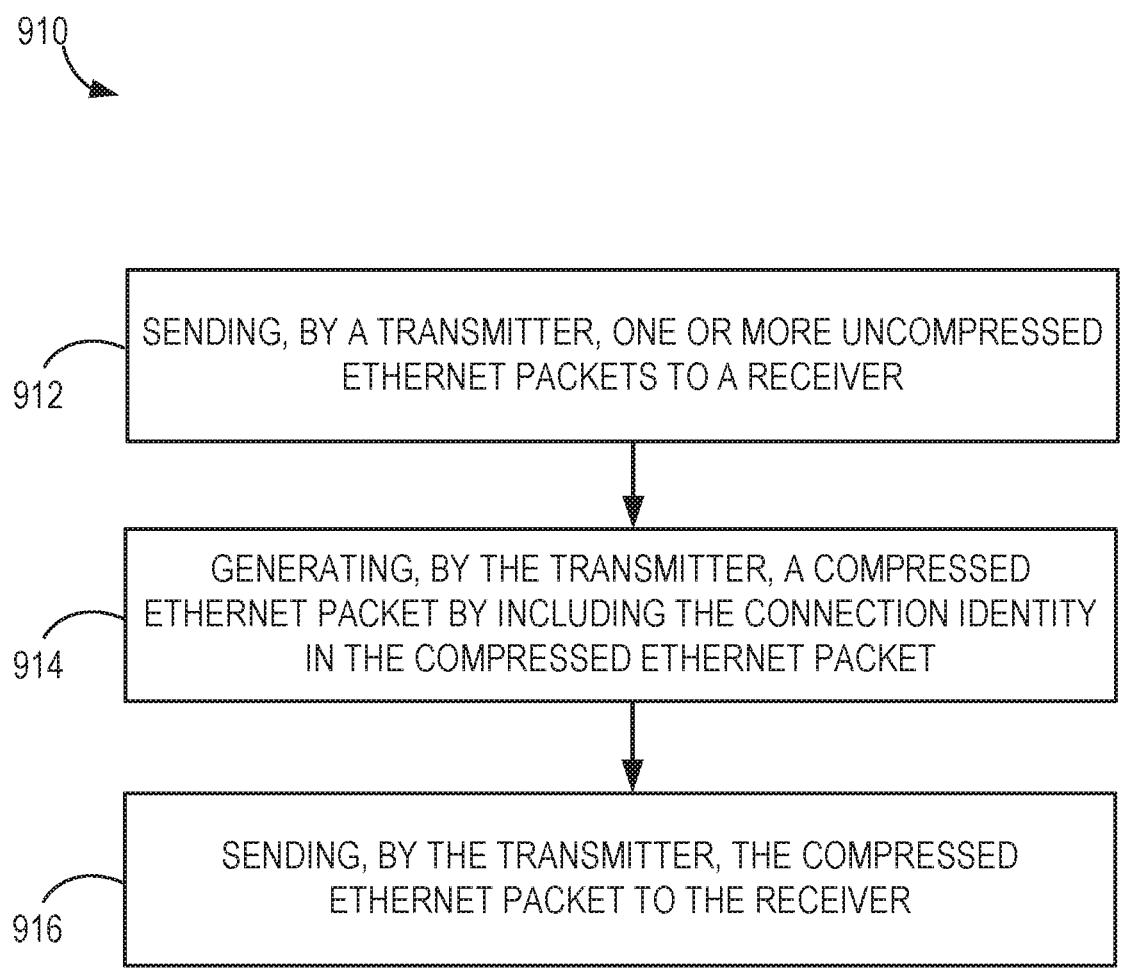

FIGS. 9A and 9B each illustrate a flowchart of an example process, according to some implementations. For clarity of presentation, the description that follows generally describes the processes in the context of the other FIGs. in this description. For example, process 900 can be performed by the PDCP layer shown in FIG. 2, and process 910 can be performed by a UE shown in FIG. 10. However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 9A is a flowchart of an example process 900 for compressing an Ethernet packet. At step 902, the process involves mapping a portion of an Ethernet packet to a connection identity to compress the Ethernet packet. At step 904, the process involves encoding, in a user plane protocol stack layer, the connection identity in a data structure for transmission.

In some implementations, the user plane protocol stack layer is a packet data convergence protocol (PDCP) layer or a service data adaptation protocol (SDAP) layer. In some implementations, the portion of the Ethernet packet is one or more of: an Ethernet packet header or an Ethernet packet trailer. In some implementations, the connection identity represents one or more fields of the portion of the Ethernet packet. In some implementations, the portion of the Ethernet packet is an Ethernet header that includes at least one of: a destination address field, a source address field, a type field, a length field, or an 802.1Q flag field. In some implementations, the Ethernet packet further includes an IP header, and the process further includes: using Robust Header Compression (ROHC) to compress the IP header, where the compression of the Ethernet header and IP header are performed separately. In some implementations, the data structure further includes a cyclic redundancy check (CRC) of the Ethernet header before compression. In some implementations, the data structure further includes a length/type field that is indicative of a payload type, and the method further includes: mapping payload types to payload identities, where the payload identities are one bit values; and including a payload identity that corresponds to a payload type of the Ethernet packet in the length/type field. In some implementations, the data structure is a packet data convergence protocol (PDCP) data protocol data unit (PDU). In some implementations, the data structure includes a Type field indicative of a format of the data structure, where the format of the data structure is indicative of the information included in the data structure.

FIG. 9B is a flowchart of an example process 910 for transmitting a compressed Ethernet packet. At step 912, the process includes sending, by a transmitter, one or more uncompressed Ethernet packets to a receiver. The one or more Ethernet packets include data indicative of a connection identity that maps in part to a source/destination address pair, and the one or more uncompressed Ethernet packets include an Ethernet header source field and an Ethernet header destination field. At step 914, the process includes generating, by the transmitter, a compressed Ethernet packet by including the connection identity in the compressed Ethernet packet. The compressed Ethernet packet does not include the Ethernet header source field and the Ethernet header destination field. At step 916, the process includes sending, by the transmitter, the compressed Ethernet packet to the receiver.

In some implementations, the process further includes receiving, by the transmitter, feedback from the receiver prior to sending the compressed Ethernet packet to the receiver. The feedback indicates whether the one or more uncompressed Ethernet packets have been successfully received by the receiver. In some implementations, the feedback includes a plurality of feedback transmissions, and a number of the plurality of feedback transmissions is based on one or more of: the receiver's mobility state, measured values of Reference Signal Received Power/Reference Signal Received Quality/Signal-To-Noise and Interference Ratio (RSRP/RSRQ/SINR), or desired degree of transmission reliability. In some implementations, sending, by the transmitter, one or more uncompressed Ethernet packets to the receiver includes determining whether to send the one or more uncompressed Ethernet packets to the receiver prior to sending the compressed Ethernet packet to the receiver. The determination is based on at least one of: (i) a link quality between the transmitter and the receiver or (ii) a desired degree of transmission reliability. In some implementations, a number of the one or more uncompressed Ethernet packets is based on one or more of: the receiver's mobility state, measured values of Reference Signal Received Power/Reference Signal Received Quality/Signal-To-Noise and Interference Ratio (RSRP/RSRQ/SINR), or desired degree of transmission reliability. In some implementations, a number of the one or more uncompressed Ethernet packets is configured by a network that serves the transmitter. In some implementations, a number of the one or more uncompressed Ethernet packets is predetermined.

The example processes shown in FIGS. 9A and 9B can be modified or reconfigured to include additional, fewer, or different steps (not shown in FIGS. 9A and 9B), which can be performed in the order shown or in a different order.

Figure 10:
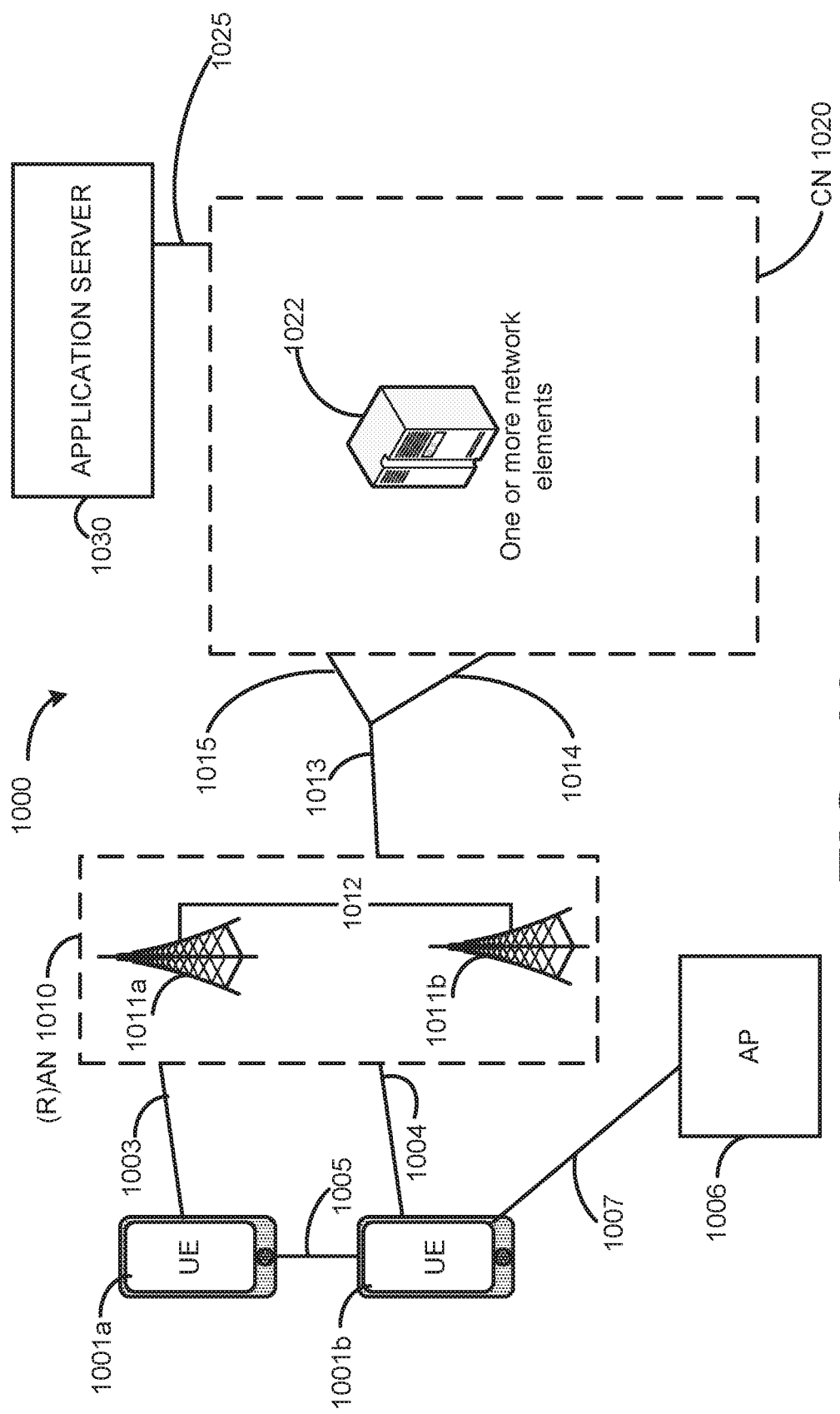
FIG. 10 illustrates an example architecture of a system 1000 of a network, according to some implementations of the present disclosure.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1001a and UE 1001b (collectively referred to as "UEs 1001" or "UE 1001"). In this example, UEs 1001 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1001 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 may be configured to connect, for example, communicatively couple, with an or RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below). In various embodiments, the UE 1001b, RAN 1010, and AP 1006 may be configured to utilize LWA operation and/or LWIP operation. The LWA operation may involve the UE 1001b in RRC_CONNECTED being configured by a RAN node 1011*a-b* to utilize radio resources of LTE and WLAN. LWIP operation may involve the UE 1001*b* using WLAN radio resources (e.g., connection 1007) via IPsec protocol tunneling to authenticate and encrypt packets (e.g., IP packets) sent over the connection 1007. IPsec tunneling may include encapsulating the entirety of original IP packets and adding a new packet header, thereby protecting the original header of the IP packets.

The RAN 1010 can include one or more AN nodes or RAN nodes 1011*a* and 1011*b* (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1011 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1011; a MAC/PHY split wherein RRC, PDCP, RLC, and MAC layers are operated by the CRAN/vBBUP and the PHY layer is operated by individual RAN nodes 1011; or a "lower PHY" split wherein RRC, PDCP, RLC, MAC layers and upper portions of the PHY layer are operated by the CRAN/vBBUP and lower portions of the PHY layer are operated by individual RAN nodes 1011. This virtualized framework allows the freed-up processor cores of the RAN nodes 1011 to perform other virtualized applications. In some implementations, an individual RAN node 1011 may represent individual gNB-DUs that are connected to a gNB-CU via individual F1 interfaces (not shown by FIG. 10). In these implementations, the gNB-DUs may include one or more remote radio heads or RFEMs (see, e.g., FIG. 13), and the gNB-CU may be operated by a server that is located in the RAN 1010 (not shown) or by a server pool in a similar manner as the CRAN/vBBUP. Additionally or alternatively, one or more of the RAN nodes 1011 may be next generation eNBs (ng-eNBs), which are RAN nodes that provide E-UTRA user plane and control plane protocol terminations toward the UEs 1001, and are connected to a 5GC (e.g., CN 1220 of FIG. 12) via an NG interface (discussed infra).

In V2X scenarios one or more of the RAN nodes 1011 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1001 (vUEs 1001). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1011 can terminate the air interface protocol and can be the first point of contact for the UEs 1001. In some embodiments, any of the RAN nodes 1011 can fulfill various logical functions for the RAN 1010 including, but not limited to, radio network controller (RNC) functions such as radio bearer management, uplink and downlink dynamic radio resource management and data packet scheduling, and mobility management.

In embodiments, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1001 and the RAN nodes 1011 may operate using LAA, eLAA, and/or feLAA mechanisms. In these implementations, the UEs 1001 and the RAN nodes 1011 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1001 RAN nodes 1011, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1001, AP 1006, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1001 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1001. The PDCCH carries information about the transport format and resource allocations related to the PDSCH channel, among other things. It may also inform the UEs 1001 about the transport format, resource allocation, and HARQ information related to the uplink shared channel. Typically, downlink scheduling (assigning control and shared channel resource blocks to the UE 1001b within a cell) may be performed at any of the RAN nodes 1011 based on channel quality information fed back from any of the UEs 1001. The downlink resource assignment information may be sent on the PDCCH used for (e.g., assigned to) each of the UEs 1001.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1011 may be configured to communicate with one another via interface 1012. In embodiments where the system 1000 is an LTE system (e.g., when CN 1020 is an EPC 1120 as in FIG. 11), the interface 1012 may be an X2 interface 1012. The X2 interface may be defined between two or more RAN nodes 1011 (e.g., two or more eNBs and the like) that connect to EPC 1020, and/or between two eNBs connecting to EPC 1020. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1001 from an SeNB for user data; information of PDCP PDUs that were not delivered to a UE 1001; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a 5G or NR system (e.g., when CN 1020 is an 5GC 1220 as in FIG. 12), the interface 1012 may be an Xn interface 1012. The Xn interface is defined between two or more RAN nodes 1011 (e.g., two or more gNBs and the like) that connect to 5GC 1020, between a RAN node 1011 (e.g., a gNB) connecting to 5GC 1020 and an eNB, and/or between two eNBs connecting to 5GC 1020. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1010 is shown to be communicatively coupled to a core network—in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1020 may be referred to as a network slice, and a logical instantiation of a portion of the CN 1020 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the S1 control plane (NG-C) interface 1015, which is a signaling interface between the RAN nodes 1011 and AMFs. Embodiments where the CN 1020 is a 5GC 1020 are discussed in more detail with regard to FIG. 12.

In embodiments, the CN 1020 may be a 5G CN (referred to as "5GC 1020" or the like), while in other embodiments, the CN 1020 may be an EPC). Where CN 1020 is an EPC (referred to as "EPC 1020" or the like), the RAN 1010 may be connected with the CN 1020 via an S1 interface 1013. In embodiments, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMEs.

Figure 11:
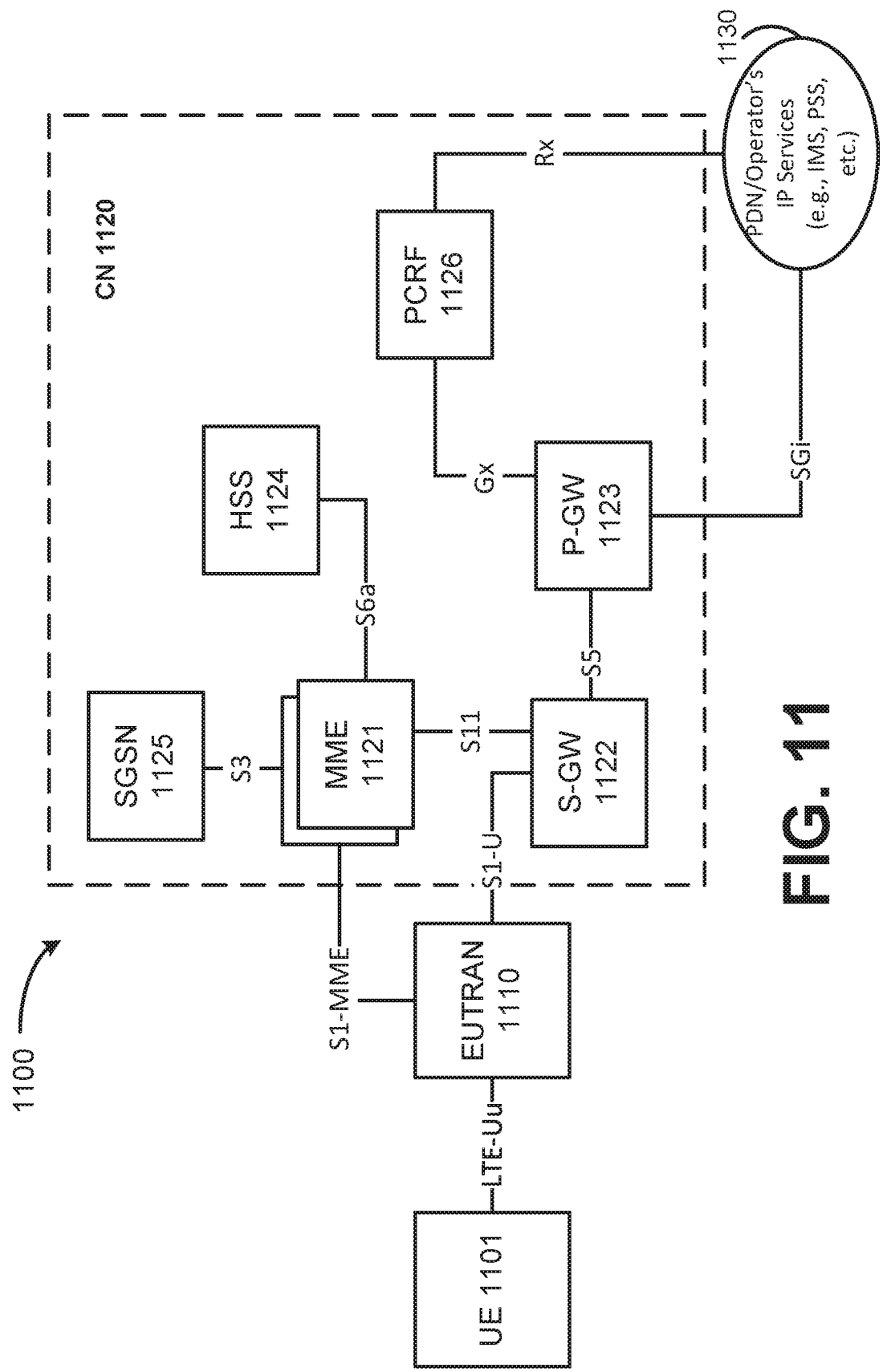
FIG. 11 illustrates an example architecture of a system including a first CN, according to some implementations of the present disclosure.

FIG. 11 illustrates an example architecture of a system 1100 including a first CN 1120, in accordance with various embodiments. In this example, system 1100 may implement the LTE standard wherein the CN 1120 is an EPC 1120 that corresponds with CN 1020 of FIG. 10. Additionally, the UE 1101 may be the same or similar as the UEs 1001 of FIG. 10, and the E-UTRAN 1110 may be a RAN that is the same or similar to the RAN 1010 of FIG. 10, and which may include RAN nodes 1011 discussed previously. The CN 1120 may comprise MMEs 1121, an S-GW 1122, a P-GW 1123, a HSS 1124, and a SGSN 1125.

The MMEs 1121 may be similar in function to the control plane of legacy SGSN, and may implement MM functions to keep track of the current location of a UE 1101. The MMEs 1121 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1101, provide user identity confidentiality, and/or perform other like services to users/subscribers. Each UE 1101 and the MME 1121 may include an MM or EMM sublayer, and an MM context may be established in the UE 1101 and the MME 1121 when an attach procedure is successfully completed. The MM context may be a data structure or database object that stores MM-related information of the UE 1101. The MMEs 1121 may be coupled with the HSS 1124 via an S6a reference point, coupled with the SGSN 1125 via an S3 reference point, and coupled with the S-GW 1122 via an S11 reference point.

The SGSN 1125 may be a node that serves the UE 1101 by tracking the location of an individual UE 1101 and performing security functions. In addition, the SGSN 1125 may perform Inter-EPC node signaling for mobility between 2G/3G and E-UTRAN 3GPP access networks; PDN and S-GW selection as specified by the MMEs 1121; handling of UE 1101 time zone functions as specified by the MMEs 1121; and MME selection for handovers to E-UTRAN 3GPP access network. The S3 reference point between the MMEs 1121 and the SGSN 1125 may enable user and bearer information exchange for inter-3GPP access network mobility in idle and/or active states.

The HSS 1124 may comprise a database for network users, including subscription-related information to support the network entities' handling of communication sessions. The EPC 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc. An S6a reference point between the HSS 1124 and the MMEs 1121 may enable transfer of subscription and authentication data for authenticating/authorizing user access to the EPC 1120 between HSS 1124 and the MMEs 1121.

The S-GW 1122 may terminate the S1 interface 1013 ("S1-U" in FIG. 11) toward the RAN 1110, and routes data packets between the RAN 1110 and the EPC 1120. In addition, the S-GW 1122 may be a local mobility anchor point for inter-RAN node handovers and also may provide an anchor for inter-3GPP mobility. Other responsibilities may include lawful intercept, charging, and some policy enforcement. The S11 reference point between the S-GW 1122 and the MMEs 1121 may provide a control plane between the MMEs 1121 and the S-GW 1122. The S-GW 1122 may be coupled with the P-GW 1123 via an S5 reference point.

The P-GW 1123 may terminate an SGi interface toward a PDN 1130. The P-GW 1123 may route data packets between the EPC 1120 and external networks such as a network including the application server 1030 (alternatively referred to as an "AF") via an IP interface 1025 (see e.g., FIG. 10). In embodiments, the P-GW 1123 may be communicatively coupled to an application server (application server 1030 of FIG. 10 or PDN 1130 in FIG. 11) via an IP communications interface 1025 (see, e.g., FIG. 10). The S5 reference point between the P-GW 1123 and the S-GW 1122 may provide user plane tunneling and tunnel management between the P-GW 1123 and the S-GW 1122. The S5 reference point may also be used for S-GW 1122 relocation due to UE 1101 mobility and if the S-GW 1122 needs to connect to a non-collocated P-GW 1123 for the required PDN connectivity. The P-GW 1123 may further include a node for policy enforcement and charging data collection (e.g., PCEF (not shown)). Additionally, the SGi reference point between the P-GW 1123 and the packet data network (PDN) 1130 may be an operator external public, a private PDN, or an intra operator packet data network, for example, for provision of IMS services. The P-GW 1123 may be coupled with a PCRF 1126 via a Gx reference point.

PCRF 1126 is the policy and charging control element of the EPC 1120. In a non-roaming scenario, there may be a single PCRF 1126 in the Home Public Land Mobile Network (HPLMN) associated with a UE 1101's Internet Protocol Connectivity Access Network (IP-CAN) session. In a roaming scenario with local breakout of traffic, there may be two PCRFs associated with a UE 1101's IP-CAN session, a Home PCRF (H-PCRF) within an HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate QoS and charging parameters. The PCRF 1126 may provision this rule into a PCEF (not shown) with the appropriate TFT and QCI, which commences the QoS and charging as specified by the application server 1130. The Gx reference point between the PCRF 1126 and the P-GW 1123 may allow for the transfer of QoS policy and charging rules from the PCRF 1126 to PCEF in the P-GW 1123. An Rx reference point may reside between the PDN 1130 (or "AF 1130") and the PCRF 1126.

Figure 12:
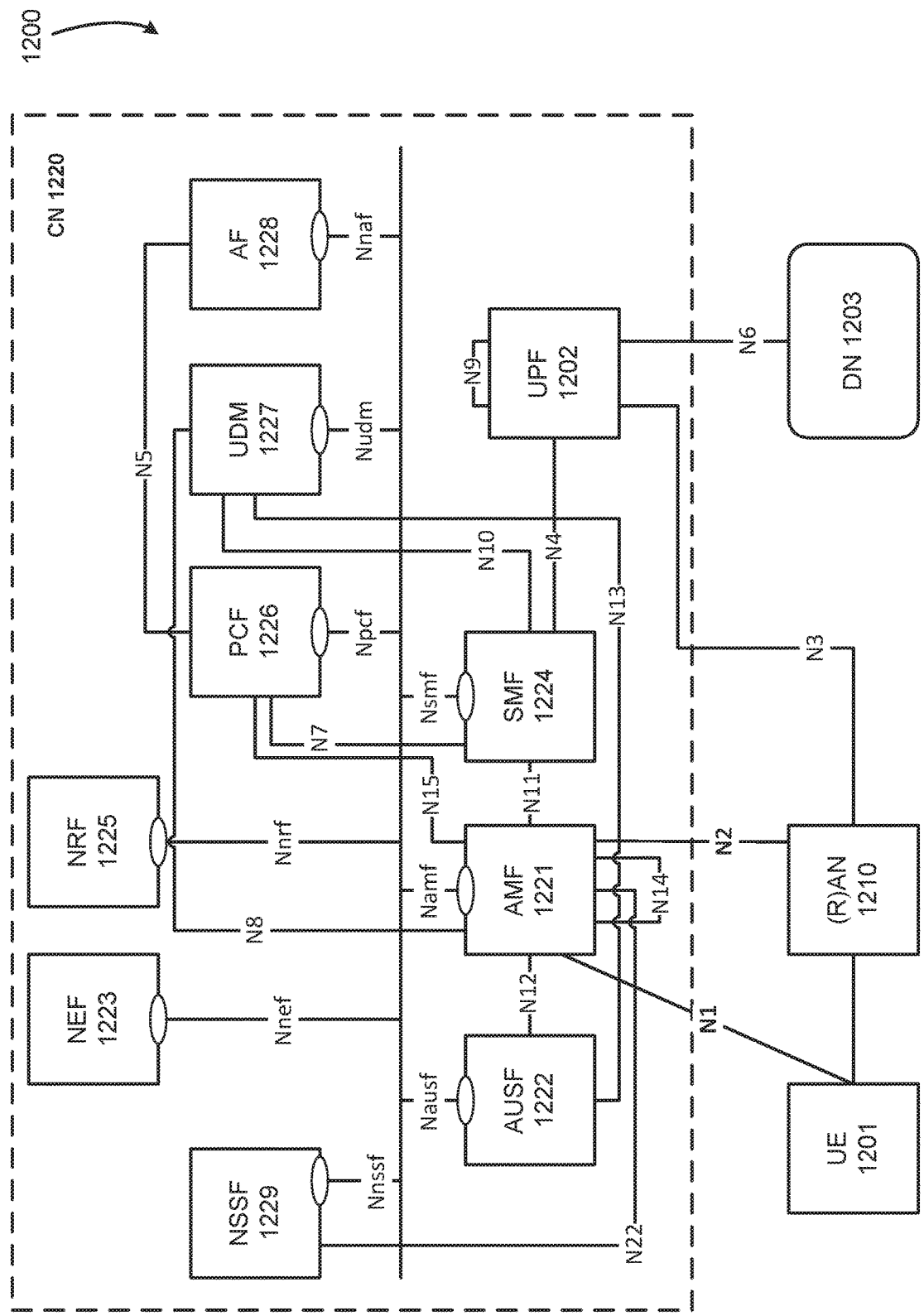
FIG. 12 illustrates an architecture of a system including a second CN, according to some implementations of the present disclosure.

FIG. 12 illustrates an architecture of a system 1200 including a second CN 1220 in accordance with various embodiments. The system 1200 is shown to include a UE 1201, which may be the same or similar to the UEs 1001 and UE 1101 discussed previously; a (R)AN 1210, which may be the same or similar to the RAN 1010 and RAN 1110 discussed previously, and which may include RAN nodes 1011 discussed previously; and a DN 1203, which may be, for example, operator services, Internet access or 3rd party services; and a 5GC 1220. The 5GC 1220 may include an AUSF 1222; an AMF 1221, a SMF 1224; a NEF 1223; a PCF 1226; a NRF 1225; a UDM 1227; an AF 1228; a UPF 1202; and a NSSF 1229.

The UPF 1202 may act as an anchor point for intra-RAT and inter-RAT mobility, an external PDU session point of interconnect to DN 1203, and a branching point to support multi-homed PDU session. The UPF 1202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1202 may include an uplink classifier to support routing traffic flows to a data network. The DN 1203 may represent various network operator services, Internet access, or third party services. DN 1203 may include, or be similar to, application server 1030 discussed previously. The UPF 1202 may interact with the SMF 1224 via an N4 reference point between the SMF 1224 and the UPF 1202.

The AUSF 1222 may store data for authentication of UE 1201 and handle authentication-related functionality. The AUSF 1222 may facilitate a common authentication framework for various access types. The AUSF 1222 may communicate with the AMF 1221 via an N12 reference point between the AMF 1221 and the AUSF 1222; and may communicate with the UDM 1227 via an N13 reference point between the UDM 1227 and the AUSF 1222. Additionally, the AUSF 1222 may exhibit an Nausf service-based interface.

The AMF 1221 may be responsible for registration management (e.g., for registering UE 1201, etc.), connection management, reachability management, mobility management, and lawful interception of AMF-related events, and access authentication and authorization. The AMF 1221 may be a termination point for the an N11 reference point between the AMF 1221 and the SMF 1224. The AMF 1221 may provide transport for SM messages between the UE 1201 and the SMF 1224, and act as a transparent proxy for routing SM messages. AMF 1221 may also provide transport for SMS messages between UE 1201 and an SMSF (not shown by FIG. 12). AMF 1221 may act as SEAF, which may include interaction with the AUSF 1222 and the UE 1201, receipt of an intermediate key that was established as a result of the UE 1201 authentication process. Where USIM based authentication is used, the AMF 1221 may retrieve the security material from the AUSF 1222. AMF 1221 may also include a SCM function, which receives a key from the SEA that it uses to derive access-network specific keys. Furthermore, AMF 1221 may be a termination point of a RAN CP interface, which may include or be an N2 reference point between the (R)AN 1210 and the AMF 1221; and the AMF 1221 may be a termination point of NAS (N1) signalling, and perform NAS ciphering and integrity protection.

AMF 1221 may also support NAS signalling with a UE 1201 over an N3 IWF interface. The N3IWF may be used to provide access to untrusted entities. N3IWF may be a termination point for the N2 interface between the (R)AN 1210 and the AMF 1221 for the control plane, and may be a termination point for the N3 reference point between the (R)AN 1210 and the UPF 1202 for the user plane. As such, the AMF 1221 may handle N2 signalling from the SMF 1224 and the AMF 1221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1201 and AMF 1221 via an N1 reference point between the UE 1201 and the AMF 1221, and relay uplink and downlink user-plane packets between the UE 1201 and UPF 1202. The N3IWF also provides mechanisms for IPsec tunnel establishment with the UE 1201. The AMF 1221 may exhibit an Namf service-based interface, and may be a termination point for an N14 reference point between two AMFs 1221 and an N17 reference point between the AMF 1221 and a 5G-EIR (not shown by FIG. 12).

The UE 1201 may need to register with the AMF 1221 in order to receive network services. RM is used to register or deregister the UE 1201 with the network (e.g., AMF 1221), and establish a UE context in the network (e.g., AMF 1221). The UE 1201 may operate in an RM-REGISTERED state or an RM-DEREGISTERED state. In the RM DEREGISTERED state, the UE 1201 is not registered with the network, and the UE context in AMF 1221 holds no valid location or routing information for the UE 1201 so the UE 1201 is not reachable by the AMF 1221. In the RM REGISTERED state, the UE 1201 is registered with the network, and the UE context in AMF 1221 may hold a valid location or routing information for the UE 1201 so the UE 1201 is reachable by the AMF 1221. In the RM-REGISTERED state, the UE 1201 may perform mobility Registration Update procedures, perform periodic Registration Update procedures triggered by expiration of the periodic update timer (e.g., to notify the network that the UE 1201 is still active), and perform a Registration Update procedure to update UE capability information or to re-negotiate protocol parameters with the network, among others.

The AMF 1221 may store one or more RM contexts for the UE 1201, where each RM context is associated with a specific access to the network. The RM context may be a data structure, database object, etc. that indicates or stores, inter alia, a registration state per access type and the periodic update timer. The AMF 1221 may also store a 5GC MM context that may be the same or similar to the (E)MM context discussed previously. In various embodiments, the AMF 1221 may store a CE mode B Restriction parameter of the UE 1201 in an associated MM context or RM context. The AMF 1221 may also derive the value, when needed, from the UE's usage setting parameter already stored in the UE context (and/or MM/RM context).

CM may be used to establish and release a signaling connection between the UE 1201 and the AMF 1221 over the N1 interface. The signaling connection is used to enable NAS signaling exchange between the UE 1201 and the CN 1220, and comprises both the signaling connection between the UE and the AN (e.g., RRC connection or UE-N3IWF connection for non-3GPP access) and the N2 connection for the UE 1201 between the AN (e.g., RAN 1210) and the AMF 1221. The UE 1201 may operate in one of two CM states, CM-IDLE mode or CM-CONNECTED mode. When the UE 1201 is operating in the CM-IDLE state/mode, the UE 1201 may have no NAS signaling connection established with the AMF 1221 over the N1 interface, and there may be (R)AN 1210 signaling connection (e.g., N2 and/or N3 connections) for the UE 1201. When the UE 1201 is operating in the CM-CONNECTED state/mode, the UE 1201 may have an established NAS signaling connection with the AMF 1221 over the N1 interface, and there may be a (R)AN 1210 signaling connection (e.g., N2 and/or N3 connections) for the UE 1201. Establishment of an N2 connection between the (R)AN 1210 and the AMF 1221 may cause the UE 1201 to transition from CM-IDLE mode to CM-CONNECTED mode, and the UE 1201 may transition from the CM-CONNECTED mode to the CM-IDLE mode when N2 signaling between the (R)AN 1210 and the AMF 1221 is released.

The SMF 1224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1201 and a data network (DN) 1203 identified by a Data Network Name (DNN). PDU sessions may be established upon UE 1201 request, modified upon UE 1201 and 5GC 1220 request, and released upon UE 1201 and 5GC 1220 request using NAS SM signaling exchanged over the N1 reference point between the UE 1201 and the SMF 1224. Upon request from an application server, the 5GC 1220 may trigger a specific application in the UE 1201. In response to receipt of the trigger message, the UE 1201 may pass the trigger message (or relevant parts/information of the trigger message) to one or more identified applications in the UE 1201. The identified application(s) in the UE 1201 may establish a PDU session to a specific DNN. The SMF 1224 may check whether the UE 1201 requests are compliant with user subscription information associated with the UE 1201. In this regard, the SMF 1224 may retrieve and/or request to receive update notifications on SMF 1224 level subscription data from the UDM 1227.

The SMF 1224 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1224 may be included in the system 1200, which may be between another SMF 1224 in a visited network and the SMF 1224 in the home network in roaming scenarios. Additionally, the SMF 1224 may exhibit the Nsmf service-based interface.

The NEF 1223 may provide means for securely exposing the services and capabilities provided by 3GPP network functions for third party, internal exposure/re-exposure, Application Functions (e.g., AF 1228), edge computing or fog computing systems, etc. In such embodiments, the NEF 1223 may authenticate, authorize, and/or throttle the AFs. NEF 1223 may also translate information exchanged with the AF 1228 and information exchanged with internal network functions. For example, the NEF 1223 may translate between an AF-Service-Identifier and an internal 5GC information. NEF 1223 may also receive information from other network functions (NFs) based on exposed capabilities of other network functions. This information may be stored at the NEF 1223 as structured data, or at a data storage NF using standardized interfaces. The stored information can then be re-exposed by the NEF 1223 to other NFs and AFs, and/or used for other purposes such as analytics. Additionally, the NEF 1223 may exhibit an Nnef service-based interface.

The NRF 1225 may support service discovery functions, receive NF discovery requests from NF instances, and provide the information of the discovered NF instances to the NF instances. NRF 1225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1225 may exhibit the Nnrf service-based interface.

The PCF 1226 may provide policy rules to control plane function(s) to enforce them, and may also support unified policy framework to govern network behaviour. The PCF 1226 may also implement an FE to access subscription information relevant for policy decisions in a UDR of the UDM 1227. The PCF 1226 may communicate with the AMF 1221 via an N15 reference point between the PCF 1226 and the AMF 1221, which may include a PCF 1226 in a visited network and the AMF 1221 in case of roaming scenarios. The PCF 1226 may communicate with the AF 1228 via an N5 reference point between the PCF 1226 and the AF 1228; and with the SMF 1224 via an N7 reference point between the PCF 1226 and the SMF 1224. The system 1200 and/or CN 1220 may also include an N24 reference point between the PCF 1226 (in the home network) and a PCF 1226 in a visited network. Additionally, the PCF 1226 may exhibit an Npcf service-based interface.

The UDM 1227 may handle subscription-related information to support the network entities' handling of communication sessions, and may store subscription data of UE 1201. For example, subscription data may be communicated between the UDM 1227 and the AMF 1221 via an N8 reference point between the UDM 1227 and the AMF. The UDM 1227 may include two parts, an application FE and a UDR (the FE and UDR are not shown by FIG. 12). The UDR may store subscription data and policy data for the UDM 1227 and the PCF 1226, and/or structured data for exposure and application data (including PFDs for application detection, application request information for multiple UEs 1201) for the NEF 1223. The Nudr service-based interface may be exhibited by the UDR 221 to allow the UDM 1227, PCF 1226, and NEF 1223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1224 via an N10 reference point between the UDM 1227 and the SMF 1224. UDM 1227 may also support SMS management, wherein an SMS-FE implements the similar application logic as discussed previously. Additionally, the UDM 1227 may exhibit the Nudm service-based interface.

The AF 1228 may provide application influence on traffic routing, provide access to the NCE, and interact with the policy framework for policy control. The NCE may be a mechanism that allows the 5GC 1220 and AF 1228 to provide information to each other via NEF 1223, which may be used for edge computing implementations. In such implementations, the network operator and third party services may be hosted close to the UE 1201 access point of attachment to achieve an efficient service delivery through the reduced end-to-end latency and load on the transport network. For edge computing implementations, the 5GC may select a UPF 1202 close to the UE 1201 and execute traffic steering from the UPF 1202 to DN 1203 via the N6 interface. This may be based on the UE subscription data, UE location, and information provided by the AF 1228. In this way, the AF 1228 may influence UPF (re)selection and traffic routing. Based on operator deployment, when AF 1228 is considered to be a trusted entity, the network operator may permit AF 1228 to interact directly with relevant NFs. Additionally, the AF 1228 may exhibit an Naf service-based interface.

The NSSF 1229 may select a set of network slice instances serving the UE 1201. The NSSF 1229 may also determine allowed NSSAI and the mapping to the subscribed S-NSSAIs, if needed. The NSSF 1229 may also determine the AMF set to be used to serve the UE 1201, or a list of candidate AMF(s) 1221 based on a suitable configuration and possibly by querying the NRF 1225. The selection of a set of network slice instances for the UE 1201 may be triggered by the AMF 1221 with which the UE 1201 is registered by interacting with the NSSF 1229, which may lead to a change of AMF 1221. The NSSF 1229 may interact with the AMF 1221 via an N22 reference point between AMF 1221 and NSSF 1229; and may communicate with another NSSF 1229 in a visited network via an N31 reference point (not shown by FIG. 12). Additionally, the NSSF 1229 may exhibit an Nnssf service-based interface.

As discussed previously, the CN 1220 may include an SMSF, which may be responsible for SMS subscription checking and verification, and relaying SM messages to/from the UE 1201 to/from other entities, such as an SMS-GMSC/IWMSC/SMS-router. The SMS may also interact with AMF 1221 and UDM 1227 for a notification procedure that the UE 1201 is available for SMS transfer (e.g., set a UE not reachable flag, and notifying UDM 1227 when UE 1201 is available for SMS).

The CN 120 may also include other elements that are not shown by FIG. 12, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 12). Individual NFs may share a UDSF for storing their respective unstructured data or individual NFs may each have their own UDSF located at or near the individual NFs. Additionally, the UDSF may exhibit an Nudsf service-based interface (not shown by FIG. 12). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 12 for clarity. In one example, the CN 1220 may include an Nx interface, which is an inter-CN interface between the MME (e.g., MME 1121) and the AMF 1221 in order to enable interworking between CN 1220 and CN 1120. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 13:
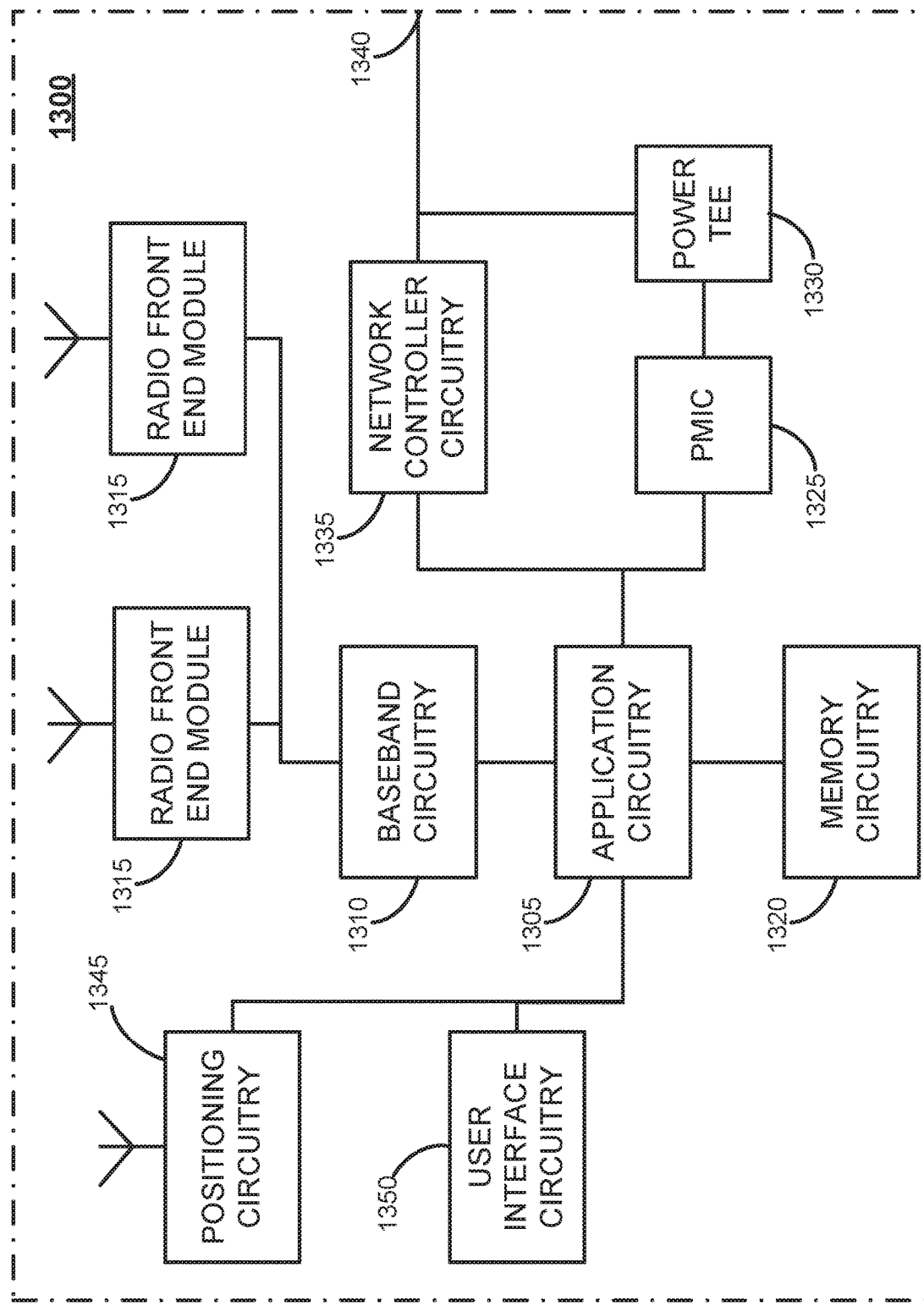
FIG. 13 illustrates an example of infrastructure equipment, according to some implementations of the present disclosure.

FIG. 13 illustrates an example of infrastructure equipment 1300 in accordance with various embodiments. The infrastructure equipment 1300 (or "system 1300") may be implemented as a base station, radio head, RAN node such as the RAN nodes 1011 and/or AP 1006 shown and described previously, application server(s) 1030, and/or any other element/device discussed herein. In other examples, the system 1300 could be implemented in or by a UE.

The system 1300 includes application circuitry 1305, baseband circuitry 1310, one or more radio front end modules (RFEMs) 1315, memory circuitry 1320, power management integrated circuitry (PMIC) 1325, power tee circuitry 1330, network controller circuitry 1335, network interface connector 1340, satellite positioning circuitry 1345, and user interface 1350. In some embodiments, the device 1300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1305 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1305 may be coupled with or may include memory/storage elements and may be configured to execute instructions stored in the memory/storage to enable various applications or operating systems to run on the system 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1305 may comprise, or may be, a special-purpose processor/controller to operate according to the various embodiments herein. As examples, the processor(s) of application circuitry 1305 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2@ provided by Cavium™, Inc.; a MIPS-based design from MIPS Technologies, Inc. such as MIPS Warrior P-class processors; and/or the like. In some embodiments, the system 1300 may not utilize application circuitry 1305, and instead may include a special-purpose processor/controller to process IP data received from an EPC or 5GC, for example.

In some implementations, the application circuitry 1305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1305 may comprise logic blocks or logic fabric, and other interconnected resources that may be programmed to perform various functions, such as the procedures, methods, functions, etc. of the various embodiments discussed herein. In such embodiments, the circuitry of application circuitry 1305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1310 are discussed infra with regard to FIG. 15.

User interface circuitry 1350 may include one or more user interfaces designed to enable user interaction with the system 1300 or peripheral component interfaces designed to enable peripheral component interaction with the system 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1511 of FIG. 15 infra), and the RFEM may be connected to multiple antennas. In alternative implementations, both mmWave and sub-mmWave radio functions may be implemented in the same physical RFEM 1315, which incorporates both mmWave antennas and sub-mmWave.

The memory circuitry 1320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1320 may be implemented as one or more of solder down packaged integrated circuits, socketed memory modules and plug-in memory cards.

The PMIC 1325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1330 may provide for electrical power drawn from a network cable to provide both power supply and data connectivity to the infrastructure equipment 1300 using a single cable.

The network controller circuitry 1335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1300 via network interface connector 1340 using a physical connection, which may be electrical (commonly referred to as a "copper interconnect"), optical, or wireless. The network controller circuitry 1335 may include one or more dedicated processors and/or FPGAs to communicate using one or more of the aforementioned protocols. In some implementations, the network controller circuitry 1335 may include multiple controllers to provide connectivity to other networks using the same or different protocols.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the baseband circuitry 1310 and/or RFEMs 1315 to communicate with the nodes and components of the positioning network. The positioning circuitry 1345 may also provide position data and/or time data to the application circuitry 1305, which may use the data to synchronize operations with various infrastructure (e.g., RAN nodes 1011, etc.), or the like.

The components shown by FIG. 13 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 14:
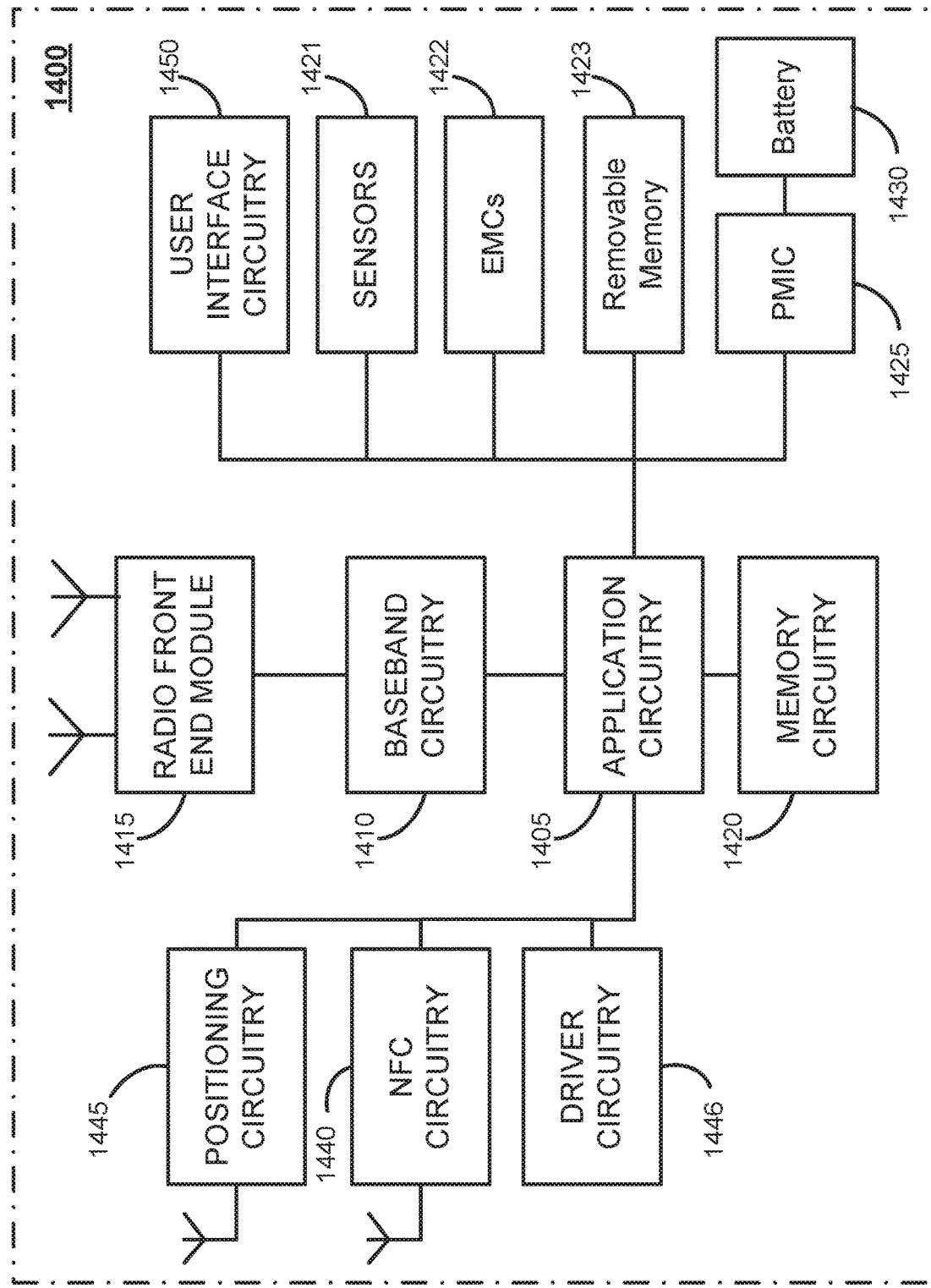
FIG. 14 illustrates an example of a platform, according to some implementations of the present disclosure.

FIG. 14 illustrates an example of a platform 1400 (or "device 1400") in accordance with various embodiments. In embodiments, the computer platform 1400 may be suitable for use as UEs 1001, 1101, 1201, application servers 1030, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1405 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1305 may comprise, or may be, a special-purpose processor/controller to operate according to the various embodiments herein.

As examples, the processor(s) of application circuitry 1405 may include an Apple A-series processor. The processors of the application circuitry 1405 may also be one or more of an Intel® Architecture Core® based processor, such as a Quark™, an Atom™, an i3, an i5, an i7, or an MCU-class processor, or another such processor available from Intel® Corporation, Santa Clara, Calif.; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1405 may be a part of a system on a chip (SoC) in which the application circuitry 1405 and other components are formed into a single integrated circuit, or a single package.

Additionally or alternatively, application circuitry 1405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1405 may comprise logic blocks or logic fabric, and other interconnected resources that may be programmed to perform various functions, such as the procedures, methods, functions, etc. of the various embodiments discussed herein. In such embodiments, the circuitry of application circuitry 1405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1410 are discussed infra with regard to FIG. 15.

The RFEMs 1415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1511 of FIG. 15 infra), and the RFEM may be connected to multiple antennas. In alternative implementations, both mmWave and sub-mmWave radio functions may be implemented in the same physical RFEM 1415, which incorporates both mmWave antennas and sub-mmWave.

The memory circuitry 1420 may include any number and type of memory devices used to provide for a given amount of system memory. As examples, the memory circuitry 1420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1420 may be developed in accordance with a Joint Electron Devices Engineering Council (JEDEC) low power double data rate (LPDDR)-based design, such as LPDDR2, LPDDR3, LPDDR4, or the like. Memory circuitry 1420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1420 may be on-die memory or registers associated with the application circuitry 1405. To provide for persistent storage of information such as data, applications, operating systems and so forth, memory circuitry 1420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1400 may incorporate the three-dimensional (3D) cross-point (XPOINT) memories from Intel® and Micron®.

Removable memory circuitry 1423 may include devices, circuitry, enclosures/housings, ports or receptacles, etc. used to couple portable data storage devices with the platform 1400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1400 may also include interface circuitry (not shown) that is used to connect external devices with the platform 1400. The external devices connected to the platform 1400 via the interface circuitry include sensor circuitry 1421 and electro-mechanical components (EMCs) 1422, as well as removable memory devices coupled to removable memory circuitry 1423.

The sensor circuitry 1421 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1422 include devices, modules, or subsystems whose purpose is to enable platform 1400 to change its state, position, and/or orientation, or move or control a mechanism or (sub)system. Additionally, EMCs 1422 may be configured to generate and send messages/signalling to other components of the platform 1400 to indicate a current state of the EMCs 1422. Examples of the EMCs 1422 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1400 is configured to operate one or more EMCs 1422 based on one or more captured events and/or instructions or control signals received from a service provider and/or various clients.

In some implementations, the interface circuitry may connect the platform 1400 with positioning circuitry 1445. The positioning circuitry 1445 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-PNT IC that uses a master timing clock to perform position tracking/estimation without GNSS assistance. The positioning circuitry 1445 may also be part of, or interact with, the baseband circuitry 1310 and/or RFEMs 1415 to communicate with the nodes and components of the positioning network. The positioning circuitry 1445 may also provide position data and/or time data to the application circuitry 1405, which may use the data to synchronize operations with various infrastructure (e.g., radio base stations), for turn-by-turn navigation applications, or the like In some implementations, the interface circuitry may connect the platform 1400 with Near-Field Communication (NFC) circuitry 1440. NFC circuitry 1440 is configured to provide contactless, short-range communications based on radio frequency identification (RFID) standards, wherein magnetic field induction is used to enable communication between NFC circuitry 1440 and NFC-enabled devices external to the platform 1400 (e.g., an "NFC touchpoint"). NFC circuitry 1440 comprises an NFC controller coupled with an antenna element and a processor coupled with the NFC controller. The NFC controller may be a chip/IC providing NFC functionalities to the NFC circuitry 1440 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1440, or initiate data transfer between the NFC circuitry 1440 and another active NFC device (e.g., a smartphone or an NFC-enabled POS terminal) that is proximate to the platform 1400.

The driver circuitry 1446 may include software and hardware elements that operate to control particular devices that are embedded in the platform 1400, attached to the platform 1400, or otherwise communicatively coupled with the platform 1400. The driver circuitry 1446 may include individual drivers allowing other components of the platform 1400 to interact with or control various input/output (I/O) devices that may be present within, or connected to, the platform 1400. For example, driver circuitry 1446 may include a display driver to control and allow access to a display device, a touchscreen driver to control and allow access to a touchscreen interface of the platform 1400, sensor drivers to obtain sensor readings of sensor circuitry 1421 and control and allow access to sensor circuitry 1421, EMC drivers to obtain actuator positions of the EMCs 1422 and/or control and allow access to the EMCs 1422, a camera driver to control and allow access to an embedded image capture device, audio drivers to control and allow access to one or more audio devices.

The power management integrated circuitry (PMIC) 1425 (also referred to as "power management circuitry 1425") may manage power provided to various components of the platform 1400. In particular, with respect to the baseband circuitry 1410, the PMIC 1425 may control power-source selection, voltage scaling, battery charging, or DC-to-DC conversion. The PMIC 1425 may often be included when the platform 1400 is capable of being powered by a battery 1430, for example, when the device is included in a UE 1001, 1101, 1201.

In some embodiments, the PMIC 1425 may control, or otherwise be part of, various power saving mechanisms of the platform 1400. For example, if the platform 1400 is in an RRC_Connected state, where it is still connected to the RAN node as it expects to receive traffic shortly, then it may enter a state known as Discontinuous Reception Mode (DRX) after a period of inactivity. During this state, the platform 1400 may power down for brief intervals of time and thus save power. If there is no data traffic activity for an extended period of time, then the platform 1400 may transition off to an RRC_Idle state, where it disconnects from the network and does not perform operations such as channel quality feedback, handover, etc. The platform 1400 goes into a very low power state and it performs paging where again it periodically wakes up to listen to the network and then powers down again. The platform 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1430 may power the platform 1400, although in some examples the platform 1400 may be mounted deployed in a fixed location, and may have a power supply coupled to an electrical grid. The battery 1430 may be a lithium ion battery, a metal-air battery, such as a zinc-air battery, an aluminum-air battery, a lithium-air battery, and the like. In some implementations, such as in V2X applications, the battery 1430 may be a typical lead-acid automotive battery.

In some implementations, the battery 1430 may be a "smart battery," which includes or is coupled with a Battery Management System (BMS) or battery monitoring integrated circuitry. The BMS may be included in the platform 1400 to track the state of charge (SoCh) of the battery 1430. The BMS may be used to monitor other parameters of the battery 1430 to provide failure predictions, such as the state of health (SoH) and the state of function (SoF) of the battery 1430. The BMS may communicate the information of the battery 1430 to the application circuitry 1405 or other components of the platform 1400. The BMS may also include an analog-to-digital (ADC) convertor that allows the application circuitry 1405 to directly monitor the voltage of the battery 1430 or the current flow from the battery 1430. The battery parameters may be used to determine actions that the platform 1400 may perform, such as transmission frequency, network operation, sensing frequency, and the like.

A power block, or other power supply coupled to an electrical grid may be coupled with the BMS to charge the battery 1430. In some examples, the power block XS30 may be replaced with a wireless power receiver to obtain the power wirelessly, for example, through a loop antenna in the computer platform 1400. In these examples, a wireless battery charging circuit may be included in the BMS. The specific charging circuits chosen may depend on the size of the battery 1430, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1450 includes various input/output (I/O) devices present within, or connected to, the platform 1400, and includes one or more user interfaces designed to enable user interaction with the platform 1400 and/or peripheral component interfaces designed to enable peripheral component interaction with the platform 1400. The user interface circuitry 1450 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1400. The output device circuitry may also include speakers or other audio emitting devices, printer(s), and/or the like. In some embodiments, the sensor circuitry 1421 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1400 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 15:
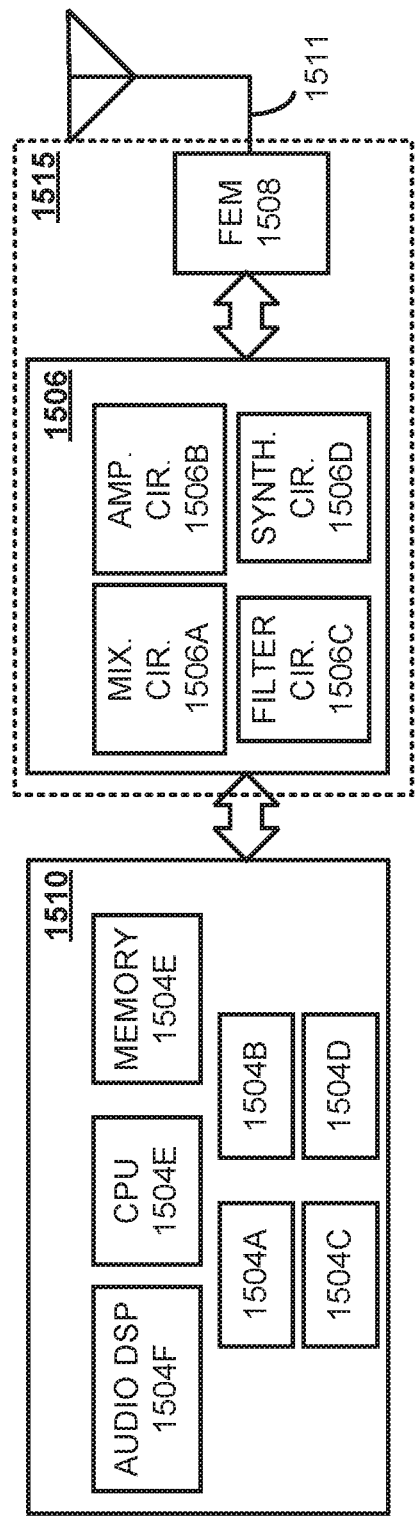
FIG. 15 illustrates example components of baseband circuitry and radio front end modules (RFEM), according to some implementations of the present disclosure.

FIG. 15 illustrates example components of baseband circuitry 1510 and radio front end modules (RFEM) 1515 in accordance with various embodiments. The baseband circuitry 1510 corresponds to the baseband circuitry 1310 and 1410 of FIGS. 13 and 14, respectively. The RFEM 1515 corresponds to the RFEM 1315 and 1415 of FIGS. 13 and 14, respectively. As shown, the RFEMs 1515 may include Radio Frequency (RF) circuitry 1506, front-end module (FEM) circuitry 1508, antenna array 1511 coupled together at least as shown.

The baseband circuitry 1510 includes circuitry and/or control logic configured to carry out various radio/network protocol and radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1510 may include Fast-Fourier Transform (FFT), precoding, or constellation mapping/demapping functionality. In some embodiments, encoding/decoding circuitry of the baseband circuitry 1510 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1510 is configured to process baseband signals received from a receive signal path of the RF circuitry 1506 and to generate baseband signals for a transmit signal path of the RF circuitry 1506. The baseband circuitry 1510 is configured to interface with application circuitry 1305/1405 (see FIGS. 13 and 14) for generation and processing of the baseband signals and for controlling operations of the RF circuitry 1506. The baseband circuitry 1510 may handle various radio control functions.

The aforementioned circuitry and/or control logic of the baseband circuitry 1510 may include one or more single or multi-core processors. For example, the one or more processors may include a 3G baseband processor 1504A, a 4G/LTE baseband processor 1504B, a 5G/NR baseband processor 1504C, or some other baseband processor(s) 1504D for other existing generations, generations in development or to be developed in the future (e.g., sixth generation (6G), etc.). In other embodiments, some or all of the functionality of baseband processors 1504A-D may be included in modules stored in the memory 1504G and executed via a Central Processing Unit (CPU) 1504E. In other embodiments, some or all of the functionality of baseband processors 1504A-D may be provided as hardware accelerators (e.g., FPGAs, ASICs, etc.) loaded with the appropriate bit streams or logic blocks stored in respective memory cells. In various embodiments, the memory 1504G may store program code of a real-time OS (RTOS), which when executed by the CPU 1504E (or other baseband processor), is to cause the CPU 1504E (or other baseband processor) to manage resources of the baseband circuitry 1510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1510 includes one or more audio digital signal processor(s) (DSP) 1504F. The audio DSP(s) 1504F include elements for compression/decompression and echo cancellation and may include other suitable processing elements in other embodiments.

In some embodiments, each of the processors 1504A-1504E include respective memory interfaces to send/receive data to/from the memory 1504G. The baseband circuitry 1510 may further include one or more interfaces to communicatively couple to other circuitries/devices, such as an interface to send/receive data to/from memory external to the baseband circuitry 1510; an application circuitry interface to send/receive data to/from the application circuitry 1305/1405 of FIGS. 13-XT); an RF circuitry interface to send/receive data to/from RF circuitry 1506 of FIG. 15; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1425.

In alternate embodiments (which may be combined with the above described embodiments), baseband circuitry 1510 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1510 may include protocol processing circuitry with one or more instances of control circuitry (not shown) to provide control functions for the digital baseband circuitry and/or radio frequency circuitry (e.g., the radio front end modules 1515).

Although not shown by FIG. 15, in some embodiments, the baseband circuitry 1510 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1510 and/or RF circuitry 1506 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1510 and/or RF circuitry 1506 are part of a Wi-Fi communication system. In the second example, the protocol processing circuitry would operate Wi-Fi MAC and logical link control (LLC) functions. The protocol processing circuitry may include one or more memory structures (e.g., 1504G) to store program code and data for operating the protocol functions, as well as one or more processing cores to execute the program code and perform various operations using the data. The baseband circuitry 1510 may also support radio communications for more than one wireless protocol.

The various hardware elements of the baseband circuitry 1510 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1510 may be suitably combined in a single chip or chipset, or disposed on a same circuit board. In another example, some or all of the constituent components of the baseband circuitry 1510 and RF circuitry 1506 may be implemented together such as, for example, a system on a chip (SoC) or System-in-Package (SiP). In another example, some or all of the constituent components of the baseband circuitry 1510 may be implemented as a separate SoC that is communicatively coupled with and RF circuitry 1506 (or multiple instances of RF circuitry 1506). In yet another example, some or all of the constituent components of the baseband circuitry 1510 and the application circuitry 1305/1405 may be implemented together as individual SoCs mounted to a same circuit board (e.g., a "multi-chip package").

In some embodiments, the baseband circuitry 1510 may provide for communication compatible with one or more radio technologies. For example, in some embodiments, the baseband circuitry 1510 may support communication with an E-UTRAN or other WMAN, a WLAN, a WPAN. Embodiments in which the baseband circuitry 1510 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path, which may include circuitry to down-convert RF signals received from the FEM circuitry 1508 and provide baseband signals to the baseband circuitry 1510. RF circuitry 1506 may also include a transmit signal path, which may include circuitry to up-convert baseband signals provided by the baseband circuitry 1510 and provide RF output signals to the FEM circuitry 1508 for transmission.

In some embodiments, the receive signal path of the RF circuitry 1506 may include mixer circuitry 1506a, amplifier circuitry 1506b and filter circuitry 1506c. In some embodiments, the transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1510 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1510 and may be filtered by filter circuitry 1506c.

In some embodiments, the mixer circuitry 1506a of the receive signal path and the mixer circuitry 1506a of the transmit signal path may include two or more mixers and may be arranged for quadrature downconversion and upconversion, respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a of the transmit signal path may be arranged for direct downconversion and direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1510 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1510 or the application circuitry 1305/1405 depending on the desired output frequency. In some embodiments, a divider control input (e.g., N) may be determined from a look-up table based on a channel indicated by the application circuitry 1305/1405.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path, which may include circuitry configured to operate on RF signals received from antenna array 1511, amplify the received signals and provide the amplified versions of the received signals to the RF circuitry 1506 for further processing. FEM circuitry 1508 may also include a transmit signal path, which may include circuitry configured to amplify signals for transmission provided by the RF circuitry 1506 for transmission by one or more of antenna elements of antenna array 1511. In various embodiments, the amplification through the transmit or receive signal paths may be done solely in the RF circuitry 1506, solely in the FEM circuitry 1508, or in both the RF circuitry 1506 and the FEM circuitry 1508.

In some embodiments, the FEM circuitry 1508 may include a TX/RX switch to switch between transmit mode and receive mode operation. The FEM circuitry 1508 may include a receive signal path and a transmit signal path. The receive signal path of the FEM circuitry 1508 may include an LNA to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission by one or more antenna elements of the antenna array 1511.

The antenna array 1511 comprises one or more antenna elements, each of which is configured convert electrical signals into radio waves to travel through the air and to convert received radio waves into electrical signals. For example, digital baseband signals provided by the baseband circuitry 1510 is converted into analog RF signals (e.g., modulated waveform) that will be amplified and transmitted via the antenna elements of the antenna array 1511 including one or more antenna elements (not shown). The antenna elements may be omnidirectional, direction, or a combination thereof. The antenna elements may be formed in a multitude of arranges as are known and/or discussed herein. The antenna array 1511 may comprise microstrip antennas or printed antennas that are fabricated on the surface of one or more printed circuit boards. The antenna array 1511 may be formed in as a patch of metal foil (e.g., a patch antenna) in a variety of shapes, and may be coupled with the RF circuitry 1506 and/or FEM circuitry 1508 using metal transmission lines or the like.

Processors of the application circuitry 1305/1405 and processors of the baseband circuitry 1510 may be used to execute elements of one or more instances of a protocol stack. For example, processors of the baseband circuitry 1510, alone or in combination, may be used execute Layer 3, Layer 2, or Layer 1 functionality, while processors of the application circuitry 1305/1405 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 16:
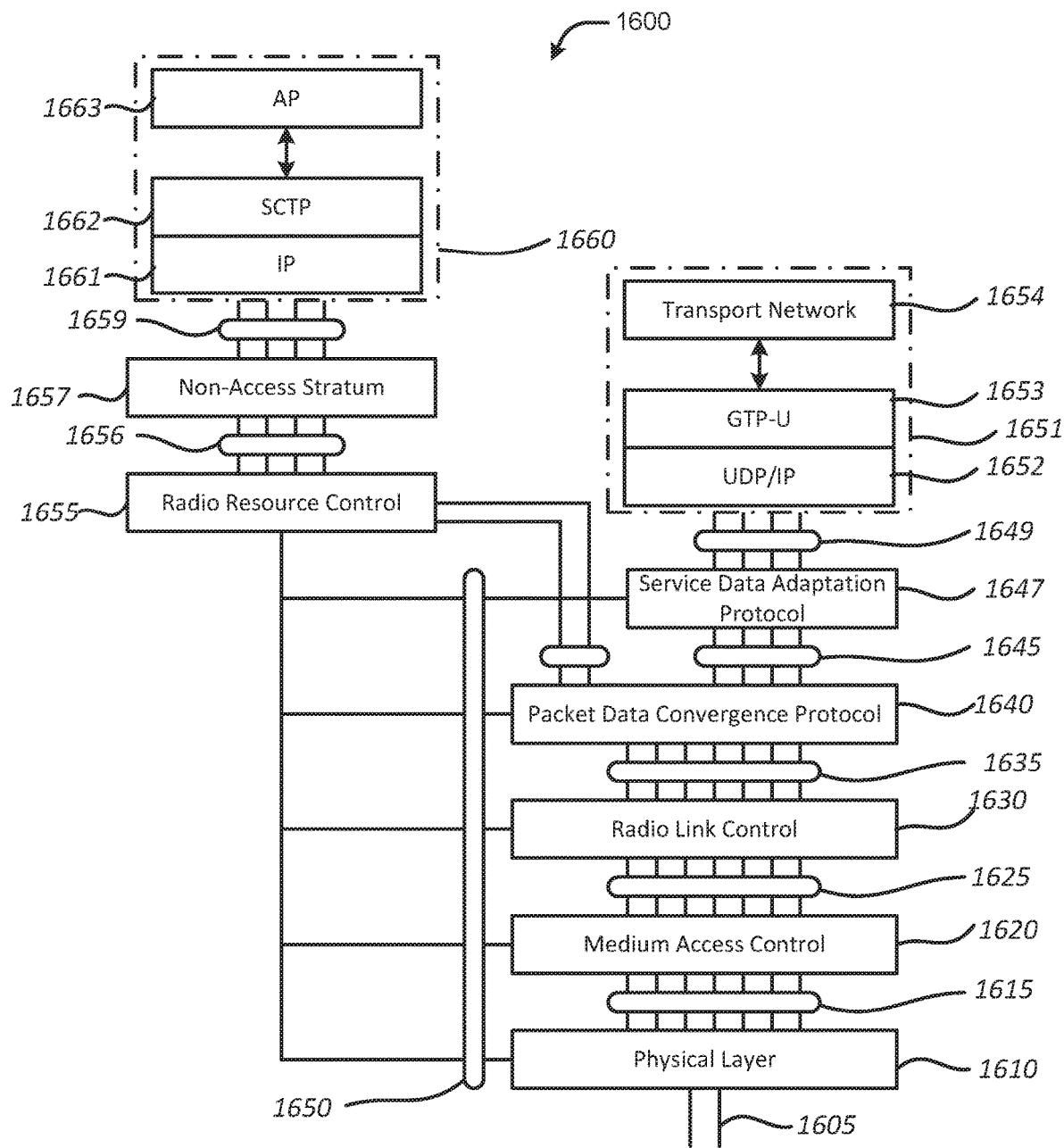
FIG. 16 illustrates various protocol functions that may be implemented in a wireless communication device, according to some implementations of the present disclosure.

FIG. 16 illustrates various protocol functions that may be implemented in a wireless communication device according to various embodiments. In particular, FIG. 16 includes an arrangement 1600 showing interconnections between various protocol layers/entities. The following description of FIG. 16 is provided for various protocol layers/entities that operate in conjunction with the 5G/NR system standards and LTE system standards, but some or all of the aspects of FIG. 16 may be applicable to other wireless communication network systems as well.

The protocol layers of arrangement 1600 may include one or more of PHY 1610, MAC 1620, RLC 1630, PDCP 1640, SDAP 1647, RRC 1655, and NAS layer 1657, in addition to other higher layer functions not illustrated. The protocol layers may include one or more service access points (e.g., items 1659, 1656, 1650, 1649, 1645, 1635, 1625, and 1615 in FIG. 16) that may provide communication between two or more protocol layers.

The PHY 1610 may transmit and receive physical layer signals 1605 that may be received from or transmitted to one or more other communication devices. The physical layer signals 1605 may comprise one or more physical channels, such as those discussed herein. The PHY 1610 may further perform link adaptation or adaptive modulation and coding (AMC), power control, cell search (e.g., for initial synchronization and handover purposes), and other measurements used by higher layers, such as the RRC 1655. The PHY 1610 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1610 may process requests from and provide indications to an instance of MAC 1620 via one or more PHY-SAP 1615. According to some embodiments, requests and indications communicated via PHY-SAP 1615 may comprise one or more transport channels.

Instance(s) of MAC 1620 may process requests from, and provide indications to, an instance of RLC 1630 via one or more MAC-SAPs 1625. These requests and indications communicated via the MAC-SAP 1625 may comprise one or more logical channels. The MAC 1620 may perform mapping between the logical channels and transport channels, multiplexing of MAC SDUs from one or more logical channels onto TBs to be delivered to PHY 1610 via the transport channels, de-multiplexing MAC SDUs to one or more logical channels from TBs delivered from the PHY 1610 via transport channels, multiplexing MAC SDUs onto TBs, scheduling information reporting, error correction through HARQ, and logical channel prioritization.

Instance(s) of RLC 1630 may process requests from and provide indications to an instance of PDCP 1640 via one or more radio link control service access points (RLC-SAP) 1635. These requests and indications communicated via RLC-SAP 1635 may comprise one or more RLC channels. The RLC 1630 may operate in a plurality of modes of operation, including: Transparent Mode™, Unacknowledged Mode (UM), and Acknowledged Mode (AM). The RLC 1630 may execute transfer of upper layer protocol data units (PDUs), error correction through automatic repeat request (ARQ) for AM data transfers, and concatenation, segmentation and reassembly of RLC SDUs for UM and AM data transfers. The RLC 1630 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1640 may process requests from and provide indications to instance(s) of RRC 1655 and/or instance(s) of SDAP 1647 via one or more packet data convergence protocol service access points (PDCP-SAP) 1645. These requests and indications communicated via PDCP-SAP 1645 may comprise one or more radio bearers. The PDCP 1640 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1647 may process requests from and provide indications to one or more higher layer protocol entities via one or more SDAP-SAP 1649. These requests and indications communicated via SDAP-SAP 1649 may comprise one or more QoS flows. The SDAP 1647 may map QoS flows to DRBs, and vice versa, and may also mark QFIs in DL and UL packets. A single SDAP entity 1647 may be configured for an individual PDU session. In the UL direction, the NG-RAN 1010 may control the mapping of QoS Flows to DRB(s) in two different ways, reflective mapping or explicit mapping. For reflective mapping, the SDAP 1647 of a UE 1001 may monitor the QFIs of the DL packets for each DRB, and may apply the same mapping for packets flowing in the UL direction. For a DRB, the SDAP 1647 of the UE 1001 may map the UL packets belonging to the QoS flows(s) corresponding to the QoS flow ID(s) and PDU session observed in the DL packets for that DRB. To enable reflective mapping, the NG-RAN 1210 may mark DL packets over the Uu interface with a QoS flow ID. The explicit mapping may involve the RRC 1655 configuring the SDAP 1647 with an explicit QoS flow to DRB mapping rule, which may be stored and followed by the SDAP 1647. In embodiments, the SDAP 1647 may only be used in NR implementations and may not be used in LTE implementations.

The RRC 1655 may configure, via one or more management service access points (M-SAP), aspects of one or more protocol layers, which may include one or more instances of PHY 1610, MAC 1620, RLC 1630, PDCP 1640 and SDAP 1647. In embodiments, an instance of RRC 1655 may process requests from and provide indications to one or more NAS entities 1657 via one or more RRC-SAPs 1656. The main services and functions of the RRC 1655 may include broadcast of system information (e.g., included in MIBs or SIBs related to the NAS), broadcast of system information related to the access stratum (AS), paging, establishment, maintenance and release of an RRC connection between the UE 1001 and RAN 1010 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1657 may form the highest stratum of the control plane between the UE 1001 and the AMF 1221. The NAS 1657 may support the mobility of the UEs 1001 and the session management procedures to establish and maintain IP connectivity between the UE 1001 and a P-GW in LTE systems.

According to various embodiments, one or more protocol entities of arrangement 1600 may be implemented in UEs 1001, RAN nodes 1011, AMF 1221 in NR implementations or MME 1121 in LTE implementations, UPF 1202 in NR implementations or S-GW 1122 and P-GW 1123 in LTE implementations, or the like to be used for control plane or user plane communications protocol stack between the aforementioned devices. In such embodiments, one or more protocol entities that may be implemented in one or more of UE 1001, gNB 1011, AMF 1221, etc. may communicate with a respective peer protocol entity that may be implemented in or on another device using the services of respective lower layer protocol entities to perform such communication. In some embodiments, a gNB-CU of the gNB 1011 may host the RRC 1655, SDAP 1647, and PDCP 1640 of the gNB that controls the operation of one or more gNB-DUs, and the gNB-DUs of the gNB 1011 may each host the RLC 1630, MAC 1620, and PHY 1610 of the gNB 1011.

In a first example, a control plane protocol stack may comprise, in order from highest layer to lowest layer, NAS 1657, RRC 1655, PDCP 1640, RLC 1630, MAC 1620, and PHY 1610. In this example, upper layers 1660 may be built on top of the NAS 1657, which includes an IP layer 1661, an SCTP 1662, and an application layer signaling protocol (AP) 1663.

In NR implementations, the AP 1663 may be an NG application protocol layer (NGAP or NG-AP) 1663 for the NG interface 1013 defined between the NG-RAN node 1011 and the AMF 1221, or the AP 1663 may be an Xn application protocol layer (XnAP or Xn-AP) 1663 for the Xn interface 1012 that is defined between two or more RAN nodes 1011.

The NG-AP 1663 may support the functions of the NG interface 1013 and may comprise Elementary Procedures (EPs). An NG-AP EP may be a unit of interaction between the NG-RAN node 1011 and the AMF 1221. The NG-AP 1663 services may comprise two groups: UE-associated services (e.g., services related to a UE 1001) and non-UE-associated services (e.g., services related to the whole NG interface instance between the NG-RAN node 1011 and AMF 1221). These services may include functions including, but not limited to: a paging function for the sending of paging requests to NG-RAN nodes 1011 involved in a particular paging area; a UE context management function for allowing the AMF 1221 to establish, modify, and/or release a UE context in the AMF 1221 and the NG-RAN node 1011; a mobility function for UEs 1001 in ECM-CONNECTED mode for intra-system HOs to support mobility within NG-RAN and inter-system HOs to support mobility from/to EPS systems; a NAS Signaling Transport function for transporting or rerouting NAS messages between UE 1001 and AMF 1221; a NAS node selection function for determining an association between the AMF 1221 and the UE 1001; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1011 via CN 1020; and/or other like functions.

The XnAP 1663 may support the functions of the Xn interface 1012 and may comprise XnAP basic mobility procedures and XnAP global procedures. The XnAP basic mobility procedures may comprise procedures used to handle UE mobility within the NG RAN 1011 (or E-UTRAN 1110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1001, such as Xn interface setup and reset procedures, NG-RAN update procedures, cell activation procedures, and the like.

In LTE implementations, the AP 1663 may be an S1 Application Protocol layer (S1-AP) 1663 for the S1 interface 1013 defined between an E-UTRAN node 1011 and an MME, or the AP 1663 may be an X2 application protocol layer (X2AP or X2-AP) 1663 for the X2 interface 1012 that is defined between two or more E-UTRAN nodes 1011.

The S1 Application Protocol layer (S1-AP) 1663 may support the functions of the S1 interface, and similar to the NG-AP discussed previously, the S1-AP may comprise S1-AP EPs. An S1-AP EP may be a unit of interaction between the E-UTRAN node 1011 and an MME 1121 within an LTE CN 1020. The S1-AP 1663 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1663 may support the functions of the X2 interface 1012 and may comprise X2AP basic mobility procedures and X2AP global procedures. The X2AP basic mobility procedures may comprise procedures used to handle UE mobility within the E-UTRAN 1020, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1001, such as X2 interface setup and reset procedures, load indication procedures, error indication procedures, cell activation procedures, and the like.

The SCTP layer (alternatively referred to as the SCTP/IP layer) 1662 may provide guaranteed delivery of application layer messages (e.g., NGAP or XnAP messages in NR implementations, or S1-AP or X2AP messages in LTE implementations). The SCTP 1662 may ensure reliable delivery of signaling messages between the RAN node 1011 and the AMF 1221/MME 1121 based, in part, on the IP protocol, supported by the IP 1661. The Internet Protocol layer (IP) 1661 may be used to perform packet addressing and routing functionality. In some implementations the IP layer 1661 may use point-to-point transmission to deliver and convey PDUs. In this regard, the RAN node 1011 may comprise L2 and L1 layer communication links (e.g., wired or wireless) with the MME/AMF to exchange information.

Ina second example, a user plane protocol stack may comprise, in order from highest layer to lowest layer, SDAP 1647, PDCP 1640, RLC 1630, MAC 1620, and PHY 1610. The user plane protocol stack may be used for communication between the UE 1001, the RAN node 1011, and UPF 1202 in NR implementations or an S-GW 1122 and P-GW 1123 in LTE implementations. In this example, upper layers 1651 may be built on top of the SDAP 1647, and may include a user datagram protocol (UDP) and IP security layer (UDP/IP) 1652, a General Packet Radio Service (GPRS) Tunneling Protocol for the user plane layer (GTP-U) 1653, and a User Plane PDU layer (UP PDU) 1663.

The transport network layer 1654 (also referred to as a "transport layer") may be built on IP transport, and the GTP-U 1653 may be used on top of the UDP/IP layer 1652 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1653 may be used for carrying user data within the GPRS core network and between the radio access network and the core network. The user data transported can be packets in any of IPv4, IPv6, or PPP formats, for example. The UDP/IP 1652 may provide checksums for data integrity, port numbers for addressing different functions at the source and destination, and encryption and authentication on the selected data flows. The RAN node 1011 and the S-GW 1122 may utilize an S1-U interface to exchange user plane data via a protocol stack comprising an LI layer (e.g., PHY 1610), an L2 layer (e.g., MAC 1620, RLC 1630, PDCP 1640, and/or SDAP 1647), the UDP/IP layer 1652, and the GTP-U 1653. The S-GW 1122 and the P-GW 1123 may utilize an S5/S8a interface to exchange user plane data via a protocol stack comprising an LI layer, an L2 layer, the UDP/IP layer 1652, and the GTP-U 1653. As discussed previously, NAS protocols may support the mobility of the UE 1001 and the session management procedures to establish and maintain IP connectivity between the UE 1001 and the P-GW 1123.

Moreover, although not shown by FIG. 16, an application layer may be present above the AP 1663 and/or the transport network layer 1654. The application layer may be a layer in which a user of the UE 1001, RAN node 1011, or other network element interacts with software applications being executed, for example, by application circuitry 1305 or application circuitry 1405, respectively. The application layer may also provide one or more interfaces for software applications to interact with communications systems of the UE 1001 or RAN node 1011, such as the baseband circuitry 1510. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 17:
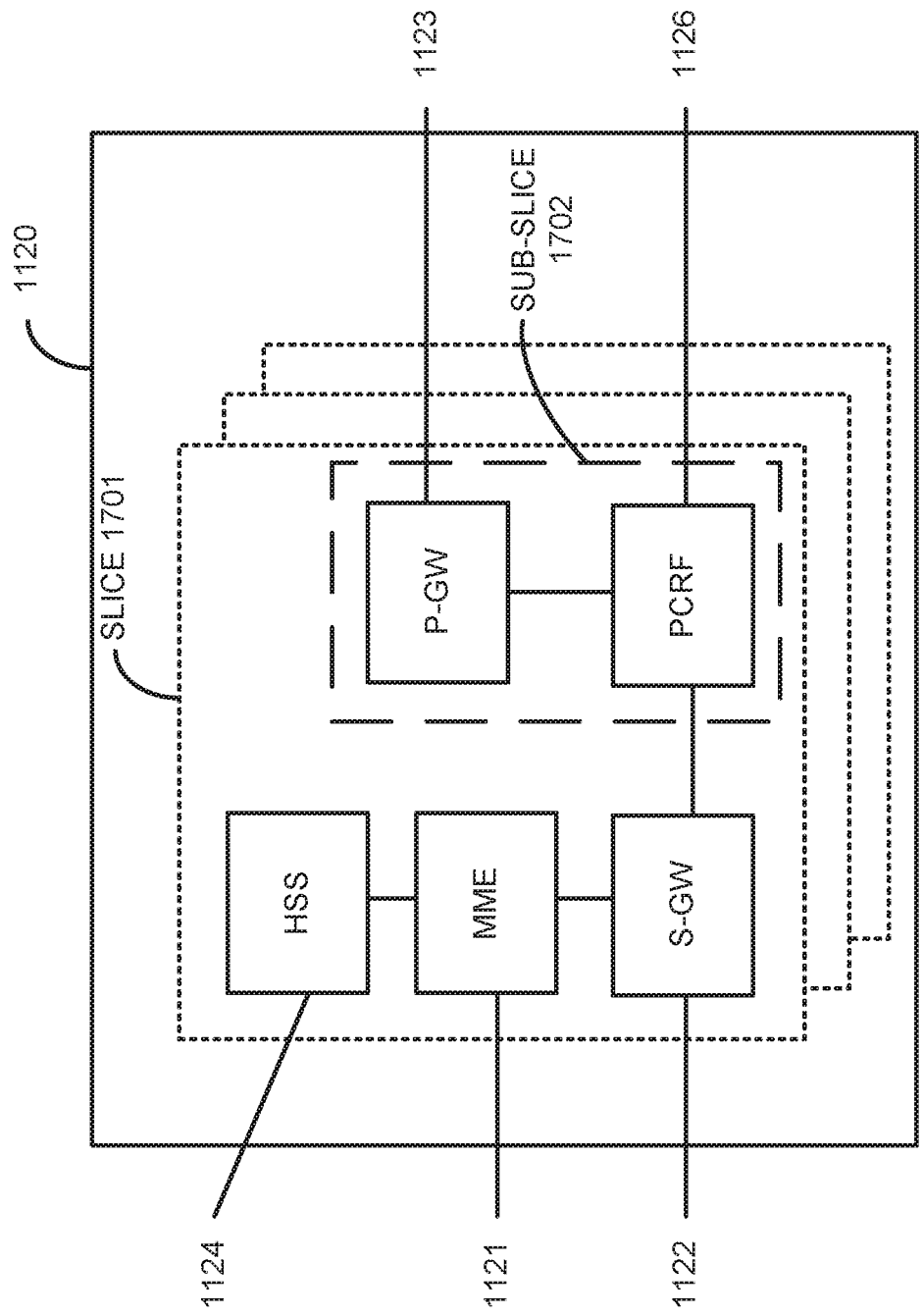
FIG. 17 illustrates components of a core network, according to some implementations of the present disclosure.

FIG. 17 illustrates components of a core network in accordance with various embodiments. The components of the CN 1120 may be implemented in one physical node or separate physical nodes including components to read and execute instructions from a machine-readable or computer-readable medium (e.g., a non-transitory machine-readable storage medium). In embodiments, the components of CN 1220 may be implemented in a same or similar manner as discussed herein with regard to the components of CN 1120. In some embodiments, NFV is utilized to virtualize any or all of the above-described network node functions via executable instructions stored in one or more computer-readable storage mediums (described in further detail below). A logical instantiation of the CN 1120 may be referred to as a network slice 1701, and individual logical instantiations of the CN 1120 may provide specific network capabilities and network characteristics. A logical instantiation of a portion of the CN 1120 may be referred to as a network sub-slice 1702 (e.g., the network sub-slice 1702 is shown to include the P-GW 1123 and the PCRF 1126).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 12), a network slice always comprises a RAN part and a CN part. The support of network slicing relies on the principle that traffic for different slices is handled by different PDU sessions. The network can realize the different network slices by scheduling and also by providing different L1/L2 configurations. The UE 1201 provides assistance information for network slice selection in an appropriate RRC message, if it has been provided by NAS. While the network can support large number of slices, the UE need not support more than 8 slices simultaneously.

A network slice may include the CN 1220 control plane and user plane NFs, NG-RANs 1210 in a serving PLMN, and a N3IWF functions in the serving PLMN. Individual network slices may have different S-NSSAI and/or may have different SSTs. NSSAI includes one or more S-NS- SAIs, and each network slice is uniquely identified by an S-NSSAI. Network slices may differ for supported features and network functions optimizations, and/or multiple network slice instances may deliver the same service/features but for different groups of UEs 1201 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1221 instance serving an individual UE 1201 may belong to each of the network slice instances serving that UE.

Network Slicing in the NG-RAN 1210 involves RAN slice awareness. RAN slice awareness includes differentiated handling of traffic for different network slices, which have been pre-configured. Slice awareness in the NG-RAN 1210 is introduced at the PDU session level by indicating the S-NSSAI corresponding to a PDU session in all signaling that includes PDU session resource information. How the NG-RAN 1210 supports the slice enabling in terms of NG-RAN functions (e.g., the set of network functions that comprise each slice) is implementation dependent. The NG-RAN 1210 selects the RAN part of the network slice using assistance information provided by the UE 1201 or the 5GC 1220, which unambiguously identifies one or more of the pre-configured network slices in the PLMN. The NG-RAN 1210 also supports resource management and policy enforcement between slices as per SLAs. A single NG-RAN node may support multiple slices, and the NG-RAN 1210 may also apply an appropriate RRM policy for the SLA in place to each supported slice. The NG-RAN 1210 may also support QoS differentiation within a slice.

The NG-RAN 1210 may also use the UE assistance information for the selection of an AMF 1221 during an initial attach, if available. The NG-RAN 1210 uses the assistance information for routing the initial NAS to an AMF 1221. If the NG-RAN 1210 is unable to select an AMF 1221 using the assistance information, or the UE 1201 does not provide any such information, the NG-RAN 1210 sends the NAS signaling to a default AMF 1221, which may be among a pool of AMFs 1221. For subsequent accesses, the UE 1201 provides a temp ID, which is assigned to the UE 1201 by the 5GC 1220, to enable the NG-RAN 1210 to route the NAS message to the appropriate AMF 1221 as long as the temp ID is valid. The NG-RAN 1210 is aware of, and can reach, the AMF 1221 that is associated with the temp ID. Otherwise, the method for initial attach applies.

The NG-RAN 1210 supports resource isolation between slices. NG-RAN 1210 resource isolation may be achieved by means of RRM policies and protection mechanisms that should avoid that shortage of shared resources if one slice breaks the service level agreement for another slice. In some implementations, it is possible to fully dedicate NG-RAN 1210 resources to a certain slice. How NG-RAN 1210 supports resource isolation is implementation dependent.

Some slices may be available only in part of the network. Awareness in the NG-RAN 1210 of the slices supported in the cells of its neighbors may be beneficial for inter-frequency mobility in connected mode. The slice availability may not change within the UE's registration area. The NG-RAN 1210 and the 5GC 1220 are responsible to handle a service request for a slice that may or may not be available in a given area. Admission or rejection of access to a slice may depend on factors such as support for the slice, availability of resources, support of the requested service by NG-RAN 1210.

The UE 1201 may be associated with multiple network slices simultaneously. In case the UE 1201 is associated with multiple slices simultaneously, only one signaling connection is maintained, and for intra-frequency cell reselection, the UE 1201 tries to camp on the best cell. For inter-frequency cell reselection, dedicated priorities can be used to control the frequency on which the UE 1201 camps. The 5GC 1220 is to validate that the UE 1201 has the rights to access a network slice. Prior to receiving an Initial Context Setup Request message, the NG-RAN 1210 may be allowed to apply some provisional/local policies, based on awareness of a particular slice that the UE 1201 is requesting to access. During the initial context setup, the NG-RAN 1210 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 18:
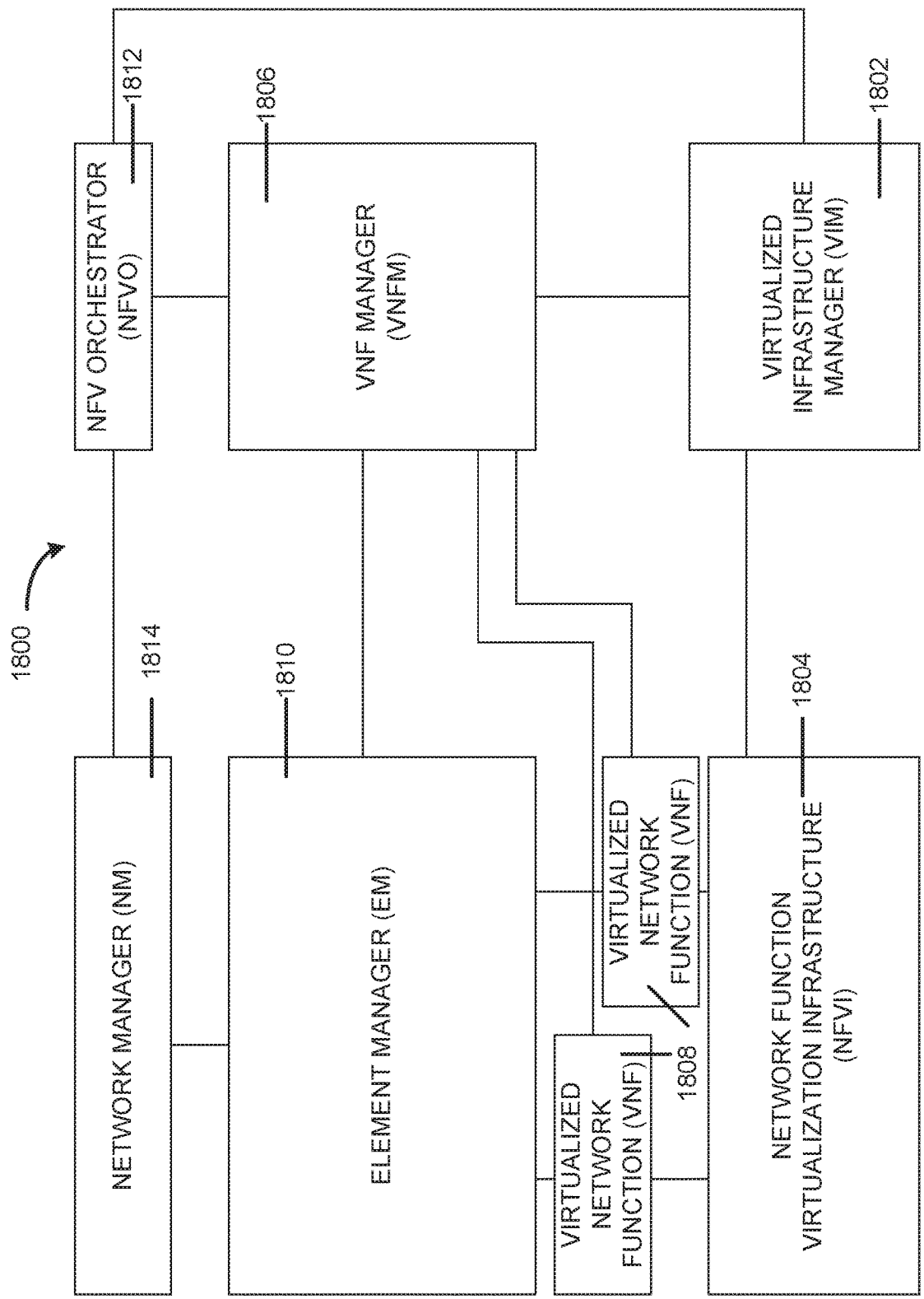
FIG. 18 is a block diagram illustrating components of a system to support NFV, according to some implementations of the present disclosure.

FIG. 18 is a block diagram illustrating components, according to some example embodiments, of a system 1800 to support NFV. The system 1800 is illustrated as including a VIM 1802, an NFVI 1804, an VNFM 1806, VNFs 1808, an EM 1810, an NFVO 1812, and a NM 1814.

The VIM 1802 manages the resources of the NFVI 1804. The NFVI 1804 can include physical or virtual resources and applications (including hypervisors) used to execute the system 1800. The VIM 1802 may manage the life cycle of virtual resources with the NFVI 1804 (e.g., creation, maintenance, and tear down of VMs associated with one or more physical resources), track VM instances, track performance, fault and security of VM instances and associated physical resources, and expose VM instances and associated physical resources to other management systems.

The VNFM 1806 may manage the VNFs 1808. The VNFs 1808 may be used to execute EPC components/functions. The VNFM 1806 may manage the life cycle of the VNFs 1808 and track performance, fault and security of the virtual aspects of VNFs 1808. The EM 1810 may track the performance, fault and security of the functional aspects of VNFs 1808. The tracking data from the VNFM 1806 and the EM 1810 may comprise, for example, PM data used by the VIM 1802 or the NFVI 1804. Both the VNFM 1806 and the EM 1810 can scale up/down the quantity of VNFs of the system 1800.

The NFVO 1812 may coordinate, authorize, release and engage resources of the NFVI 1804 in order to provide the requested service (e.g., to execute an EPC function, component, or slice). The NM 1814 may provide a package of end-user functions with the responsibility for the management of a network, which may include network elements with VNFs, non-virtualized network functions, or both (management of the VNFs may occur via the EM 1810).

Figure 19:
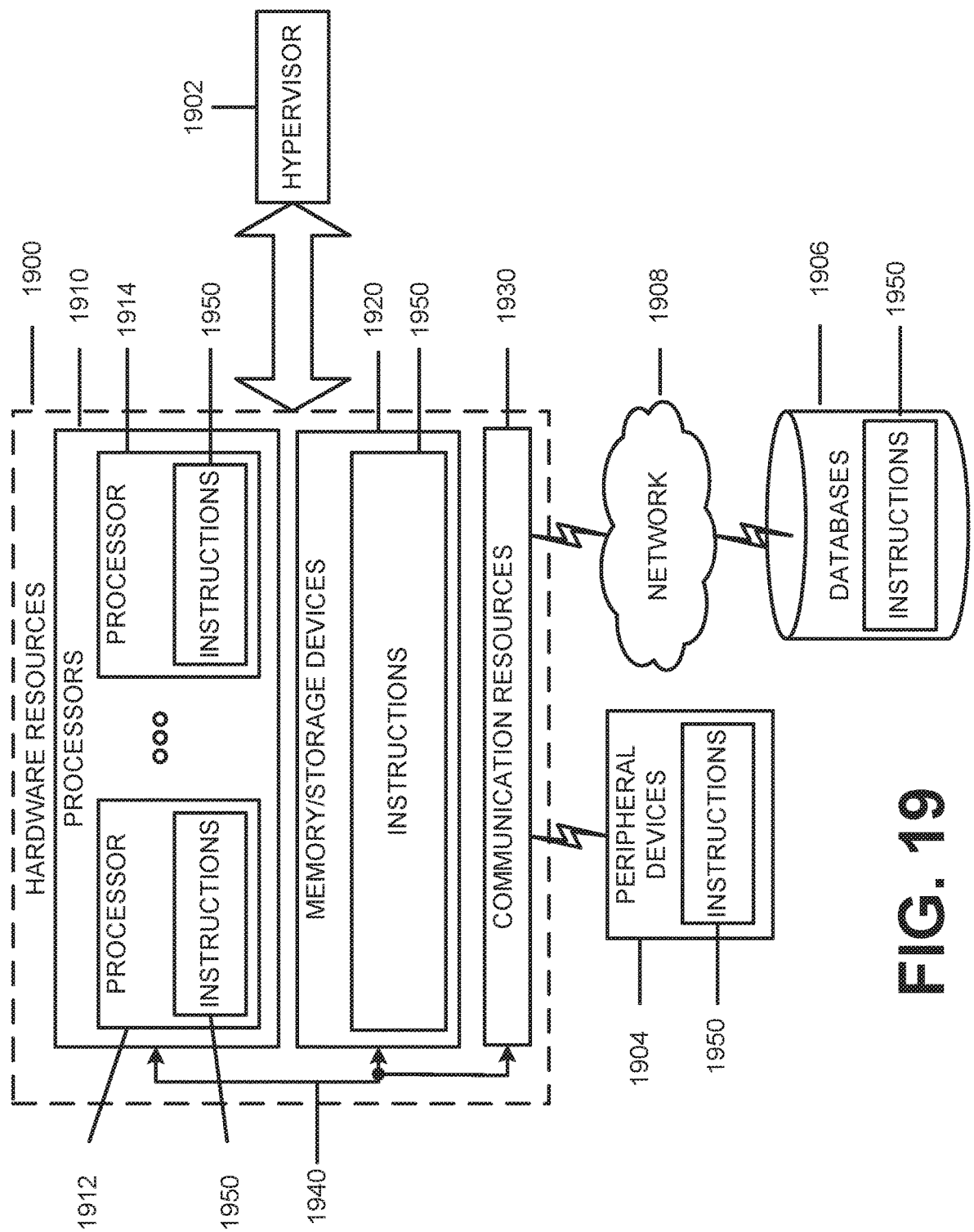
FIG. 19 is a block diagram illustrating components able to read instructions from a machine-readable or computer-readable medium (e.g., a non-transitory machine-readable storage medium) and perform any one or more of the methodologies discussed herein, according to some implementations of the present disclosure.

FIG. 19 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1900 including one or more processors (or processor cores) 1910, one or more memory/storage devices 1920, and one or more communication resources 1930, each of which may be communicatively coupled via a bus 1940. For embodiments where node virtualization (e.g., NFV) is utilized, a hypervisor 1902 may be executed to provide an execution environment for one or more network slices/sub-slices to utilize the hardware resources 1900.

The processors 1910 may include, for example, a processor 1912 and a processor 1914. The processor(s) 1910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1920 may include main memory, disk storage, or any suitable combination thereof. The memory/storage devices 1920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1930 may include interconnection or network interface components or other suitable devices to communicate with one or more peripheral devices 1904 or one or more databases 1906 via a network 1908. For example, the communication resources 1930 may include wired communication components (e.g., for coupling via USB), cellular communication components, NFC components, Bluetooth® (or Bluetooth® Low Energy) components, Wi-Fi® components, and other communication components.

Instructions 1950 may comprise software, a program, an application, an applet, an app, or other executable code for causing at least any of the processors 1910 to perform any one or more of the methodologies discussed herein. The instructions 1950 may reside, completely or partially, within at least one of the processors 1910 (e.g., within the processor's cache memory), the memory/storage devices 1920, or any suitable combination thereof. Furthermore, any portion of the instructions 1950 may be transferred to the hardware resources 1900 from any combination of the peripheral devices 1904 or the databases 1906. Accordingly, the memory of processors 1910, the memory/storage devices 1920, the peripheral devices 1904, and the databases 1906 are examples of computer-readable and machine-readable media.

What is claimed is:

1. A method for transmitting a compressed Ethernet packet, the method comprising:
    sending, by a first device, one or more uncompressed Ethernet packets to a second device, wherein the one or more uncompressed Ethernet packets include data indicative of a connection identity that maps in part to a source/destination address pair, and wherein the one or more uncompressed Ethernet packets include an Ethernet header source field and an Ethernet header destination field;
    receiving, by the first device from the second device, at least one feedback transmission from a plurality of feedback transmissions sent by the second device, wherein:
        the feedback transmission indicates whether the one or more uncompressed Ethernet packets have been successfully received by the second device; and
        a number of the plurality of feedback transmissions is based on one or more of: the second device's mobility state, a first measured value of Reference Signal Received Power, a second measured value of Reference Signal Received Quality, a third measured value of Signal-To-Noise and Interference Ratio, or desired degree of transmission reliability;
    based at least on receiving the feedback transmission from the second device, generating, by the first device, a compressed Ethernet packet by including the connection identity in the compressed Ethernet packet, wherein the compressed Ethernet packet does not include the Ethernet header source field and the Ethernet header destination field; and
    sending, by the first device, the compressed Ethernet packet to the second device.

2. The method of claim 1, wherein sending, by the first device, the one or more uncompressed Ethernet packets to the second device comprises:
    determining whether to send the one or more uncompressed Ethernet packets to the second device prior to sending the compressed Ethernet packet to the second device, wherein the determination is based on at least one of: (i) a link quality between the first device and the second device or (ii) a desired degree of transmission reliability.

3. The method of claim 1, wherein a number of the one or more uncompressed Ethernet packets is based on one or more of: the second device's mobility state, measured values of Reference Signal Received Power/Reference Signal Received Quality/Signal-To-Noise and Interference Ratio (RSRP/RSRQ/SINR), or desired degree of transmission reliability.

4. The method of claim 1, wherein a number of the one or more uncompressed Ethernet packets is predetermined by a network that serves the first device for at least one of a user equipment, a cell group, a data radio bearer, a cell, or a link direction.

5. The method of claim 1, wherein a number of the one or more uncompressed Ethernet packets is predetermined.

6. The method of claim 1, wherein the number of the plurality of feedback transmissions is based on one or more of: the second device's mobility state, the first measured value of Reference Signal Received Power, the second measured value of Reference Signal Received Quality, the third measured value of Signal-To-Noise and Interference Ratio, and the desired degree of transmission reliability.

7. The method of claim 1, comprising:
    determining a modification, other than a removal, of a mapping between i) the connection identity for the one or more uncompressed Ethernet packets to ii) one or more header fields that include at least the source/destination address pair; and
    sending, using radio resource control signaling, a signal that indicates the modification of the mapping between i) the connection identity to ii) the one or more header fields that include at least the source/destination address pair.

8. An apparatus comprising one or more processors configured to perform operations comprising:
    sending one or more uncompressed Ethernet packets to a second device, wherein the one or more uncompressed Ethernet packets include data indicative of a connection identity that maps in part to a source/destination address pair, and wherein the one or more uncompressed Ethernet packets include an Ethernet header source field and an Ethernet header destination field;

determining a modification, other than a removal, of a mapping between i) the connection identity for the one or more uncompressed Ethernet packets to ii) one or more header fields that include at least the source/destination address pair;

sending, using radio resource control signaling, a signal that indicates the modification of the mapping between i) the connection identity to ii) the one or more header fields that include at least the source/destination address pair;

generating a compressed Ethernet packet by including the connection identity in the compressed Ethernet packet, wherein the compressed Ethernet packet does not include the Ethernet header source field and the Ethernet header destination field; and sending the compressed Ethernet packet to the second device.

9. The apparatus of claim 8, the operations further comprising:

receiving feedback from the second device prior to sending the compressed Ethernet packet to the second device, wherein the feedback indicates whether the one or more uncompressed Ethernet packets have been successfully received by the second device.

10. The apparatus of claim 9, wherein the feedback comprises a plurality of feedback transmissions, and wherein a number of the plurality of feedback transmissions is based on one or more of: the second device's mobility state, measured values of Reference Signal Received Power/Reference Signal Received Quality/Signal-To-Noise and Interference Ratio (RSRP/RSRQ/SINR), or desired degree of transmission reliability.

11. The apparatus of claim 8, wherein sending the one or more uncompressed Ethernet packets to the second device comprises:

determining whether to send the one or more uncompressed Ethernet packets to the second device prior to sending the compressed Ethernet packet to the second device, wherein the determination is based on at least a link quality between the apparatus and the second device.

12. The apparatus of claim 8, wherein a number of the one or more uncompressed Ethernet packets is based on one or more of: the second device's mobility state, or measured values of Reference Signal Received Power/Reference Signal Received Quality/Signal-To-Noise and Interference Ratio (RSRP/RSRQ/SINR).

13. The apparatus of claim 8, wherein a number of the one or more uncompressed Ethernet packets is predetermined by a network that serves the apparatus for at least one of a user equipment, a cell group, a data radio bearer, a cell, or a link direction.

14. The apparatus of claim 8, wherein the connection identity is specific to a link direction of either an uplink direction or a downlink direction and the other link direction has an independent connection identity.

15. A method comprising:

identifying one or more uncompressed Ethernet packets that were transmitted by a first device, wherein the one or more uncompressed Ethernet packets include data indicative of a connection identity that maps in part to a source/destination address pair, and wherein the one or more uncompressed Ethernet packets include an Ethernet header source field and an Ethernet header destination field;

determining a number of a plurality of feedback transmissions based on one or more of: a second device's mobility state, a first measured value of Reference Signal Received Power, a second measured value of Reference Signal Received Quality, a third measured value of Signal-To-Noise and Interference Ratio, or desired degree of transmission reliability, wherein the feedback transmissions indicate whether the one or more uncompressed Ethernet packets have been successfully received;

transmitting, to the first device, the number of the plurality of feedback transmissions prior to receipt of a compressed Ethernet packet;

receiving the compressed Ethernet packet transmitted by the first device, wherein the compressed Ethernet packet includes the connection identity, and wherein the compressed Ethernet packet does not include the Ethernet header source field and the Ethernet header destination field; and decompressing the compressed Ethernet packet based at least in part on the connection identity.

16. The method of claim 15, wherein a number of the one or more uncompressed Ethernet packets is based on one or more of:

the second device's mobility state, or measured values of Reference Signal Received Power/Reference Signal Received Quality/Signal-To-Noise and Interference Ratio (RSRP/RSRQ/SINR).

17. The method of claim 15, wherein a number of the one or more uncompressed Ethernet packets is predetermined by a network that serves the first device for at least one of a user equipment, a cell group, a data radio bearer, a cell, or a link direction.

18. The method of claim 15, wherein a number of the one or more uncompressed Ethernet packets is predetermined.

* * * * *

UNITED STATES PATENT AND TRADEMARK OFFICE
CERTIFICATE OF CORRECTION

PATENT NO. : 11,792,302 B2
APPLICATION NO. : 17/439311
DATED : October 17, 2023
INVENTOR(S) : Yujian Zhang et al.

Page 1 of 1

It is certified that error appears in the above-identified patent and that said Letters Patent is hereby corrected as shown below:

In the Claims

Column 48, Line 35, in Claim 3, delete "SINR)," and insert -- SNIR), --;

Column 49, Line 34, in Claim 10, delete "SINR)," and insert -- SNIR), --;

Column 49, Line 50, in Claim 12, delete "SINR)." and insert -- SNIR). --; and

Column 50, Line 44, in Claim 16, delete "SINR)." and insert -- SNIR). --.

Signed and Sealed this
Thirtieth Day of January, 2024

Katherine Kelly Vidal
*Director of the United States Patent and Trademark Office*